United States Patent
Wheatley et al.

(10) Patent No.: US 11,009,637 B2
(45) Date of Patent: May 18, 2021

(54) OPTICAL STACK

(71) Applicant: 3M INNOVATIVE PROPERTIES COMPANY, St. Paul, MN (US)

(72) Inventors: John A. Wheatley, Stillwater, MN (US); Guanglei Du, New York, NY (US); Gilles J. Benoit, Minneapolis, MN (US); Rolf W. Biernath, Wyoming, MN (US); Christopher A. McLaughlin, Lino Lakes, MN (US); Sherie A. Kristie, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 294 days.

(21) Appl. No.: 16/309,187

(22) PCT Filed: Jun. 30, 2017

(86) PCT No.: PCT/US2017/040290
§ 371 (c)(1),
(2) Date: Dec. 12, 2018

(87) PCT Pub. No.: WO2018/013363
PCT Pub. Date: Jan. 18, 2018

(65) Prior Publication Data
US 2019/0331837 A1    Oct. 31, 2019

Related U.S. Application Data

(60) Provisional application No. 62/361,246, filed on Jul. 12, 2016.

(51) Int. Cl.
*G02B 5/28* (2006.01)
*G02B 5/08* (2006.01)
(Continued)

(52) U.S. Cl.
CPC .......... *G02B 5/287* (2013.01); *G02B 5/0841* (2013.01); *G02B 5/22* (2013.01); *G02B 5/26* (2013.01);
(Continued)

(58) Field of Classification Search
CPC ...... G02B 26/06; G02B 5/285; G02B 5/0816; G02B 5/0825; G02B 5/26; G02B 5/305;
(Continued)

(56) References Cited

U.S. PATENT DOCUMENTS 5,440,446 A   8/1995  Shaw
5,882,774 A   3/1999  Jonza
(Continued)

FOREIGN PATENT DOCUMENTS

WO   WO 99/36805     7/1999
WO   WO 2003-100366  12/2003
(Continued)

OTHER PUBLICATIONS

International Search Report for PCT International Application No. PCT/US2017/040290, dated Sep. 29, 2017, 9 pages.

*Primary Examiner* — Evelyn A Lester
(74) *Attorney, Agent, or Firm* — Clifton F. Richardson

(57) ABSTRACT

An optical stack including an oriented polymeric multilayer optical film and a non-birefringent optical filter is described. The oriented polymeric multilayer optical film has a first reflection band with a first band edge and the non-birefringent optical filter has a first blocking band. In some cases, the first blocking band contains the first band edge and the first blocking band provides a reduction in variation of a band edge of an overall blocking band of the optical stack.

20 Claims, 24 Drawing Sheets

(51) Int. Cl.
*G02B 5/22* (2006.01)
*G02B 5/26* (2006.01)
*G02B 5/30* (2006.01)
*B32B 7/12* (2006.01)
*B32B 27/36* (2006.01)
*G02B 26/06* (2006.01)

(52) U.S. Cl.
CPC ............ *G02B 5/305* (2013.01); *B32B 7/12* (2013.01); *B32B 27/36* (2013.01); *B32B 2255/26* (2013.01); *B32B 2307/412* (2013.01); *B32B 2551/00* (2013.01); *G02B 5/0816* (2013.01); *G02B 5/0825* (2013.01); *G02B 5/285* (2013.01); *G02B 26/06* (2013.01)

(58) Field of Classification Search
CPC ........ G02B 5/0841; G02B 5/22; G02B 5/287; B32B 27/36; B32B 7/12; B32B 2255/26; B32B 2307/412; B32B 2551/00
USPC ....... 359/240, 290–294, 321, 576, 580, 584, 359/586–590, 839, 883, 884, 887; 428/480, 912.2, 323
See application file for complete search history.

(56) References Cited

U.S. PATENT DOCUMENTS

| | | | |
|---|---|---|---|
| 5,962,114 A | 10/1999 | Jonza | |
| 5,965,247 A | 10/1999 | Jonza | |
| 6,451,414 B1 | 9/2002 | Wheatley | |
| 6,549,254 B1 | 4/2003 | Grupp et al. | |
| 6,916,440 B2 | 7/2005 | Jackson | |
| 6,936,209 B2 | 8/2005 | Jackson | |
| 6,939,499 B2 | 9/2005 | Merrill | |
| 6,949,212 B2 | 9/2005 | Merrill | |
| 7,018,713 B2 | 3/2006 | Padiyath | |
| 8,350,451 B2 | 1/2013 | Bright | |
| 9,034,459 B2 | 5/2015 | Condo | |
| 2003/0035972 A1* | 2/2003 | Hanson | B32B 27/08 428/480 |
| 2004/0105159 A1* | 6/2004 | Saccomanno | G02B 5/0278 359/599 |
| 2007/0097509 A1* | 5/2007 | Nevitt | G02B 5/285 359/584 |
| 2008/0003419 A1 | 1/2008 | Hebrink | |
| 2009/0323180 A1 | 12/2009 | Weber | |
| 2010/0089621 A1 | 4/2010 | Stoss | |
| 2013/0094085 A1* | 4/2013 | Merrill | G02B 5/3083 359/489.07 |
| 2015/0146166 A1 | 5/2015 | Weber | |
| 2015/0285956 A1 | 10/2015 | Schmidt | |
| 2017/0351011 A1* | 12/2017 | Tai | G02B 19/0042 |
| 2019/0121009 A1* | 4/2019 | Johnson | G02B 5/3041 |

FOREIGN PATENT DOCUMENTS

| | | |
|---|---|---|
| WO | WO 2004-093200 | 10/2004 |
| WO | WO 2014-099367 | 6/2014 |
| WO | WO 2014-110101 | 7/2014 |
| WO | WO 2016-061192 | 4/2016 |
| WO | WO 2017-213911 | 12/2017 |

\* cited by examiner

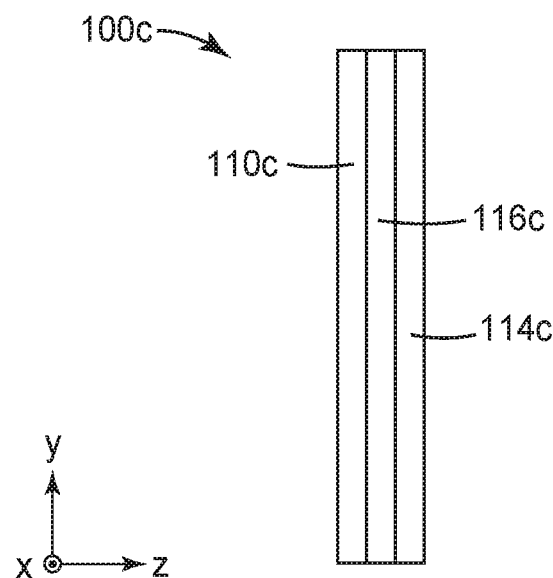
FIG. 1C
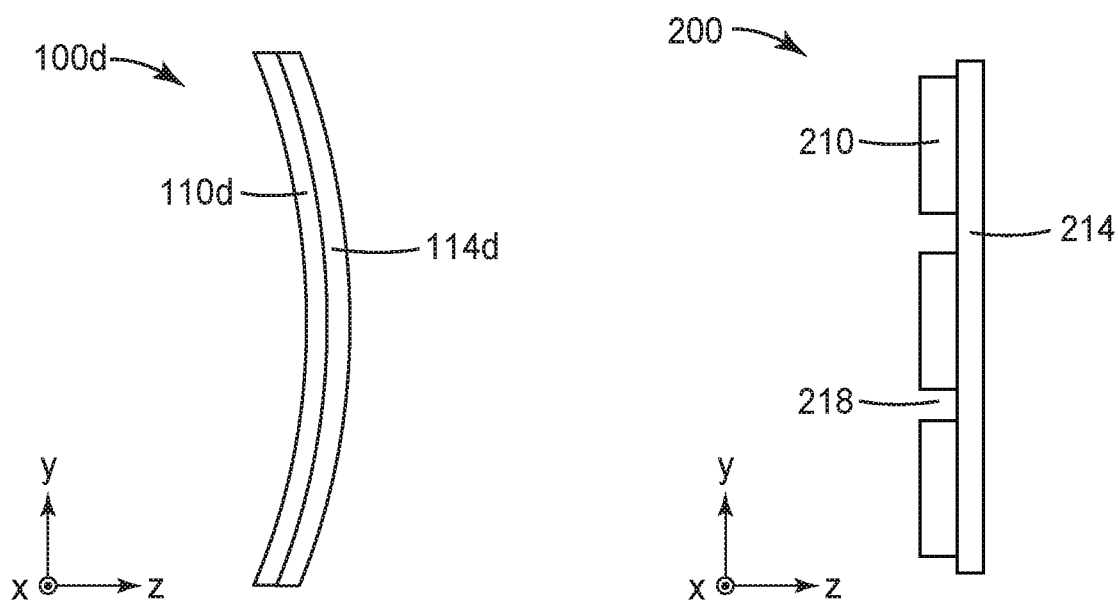
FIG. 1D
FIG. 2

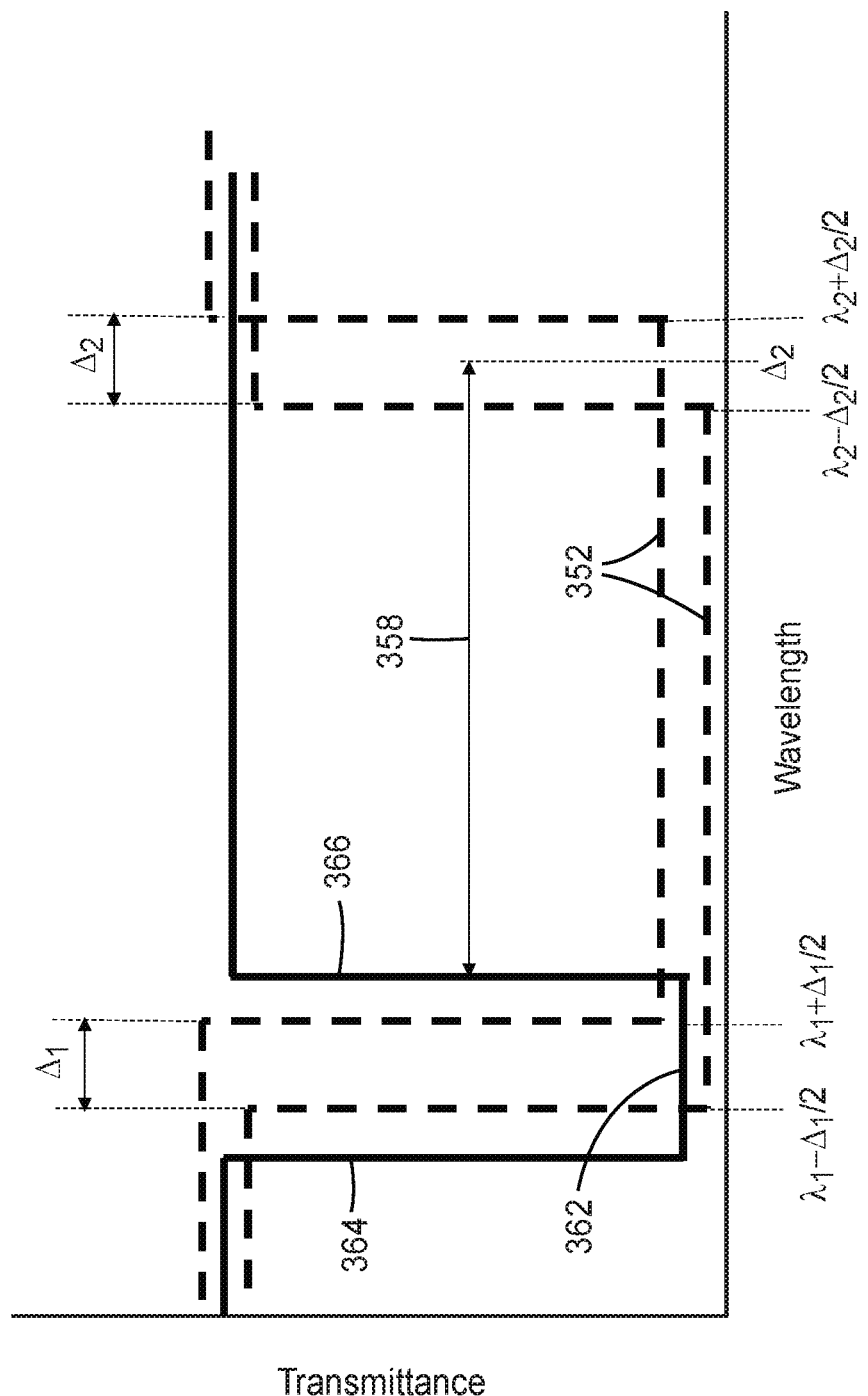

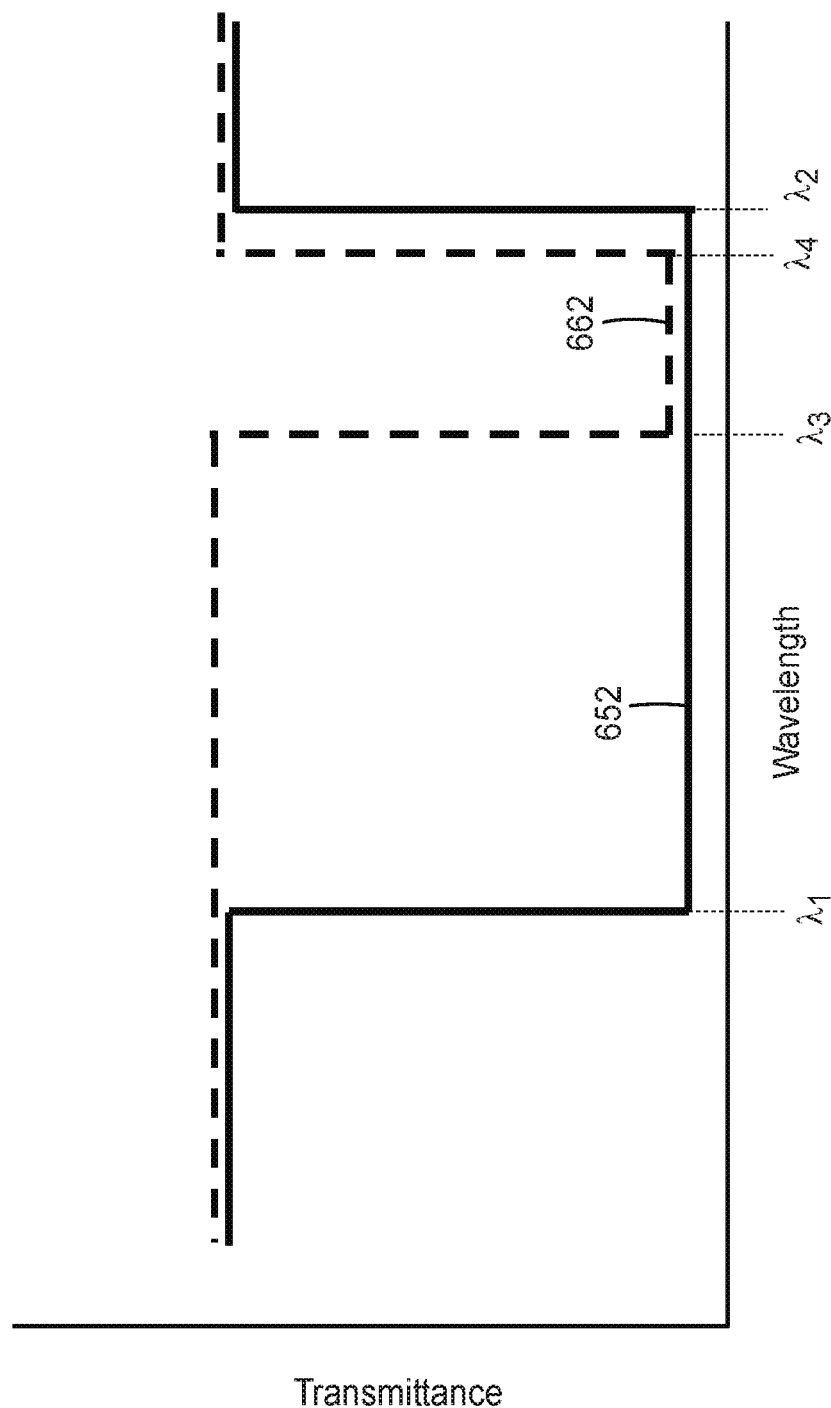

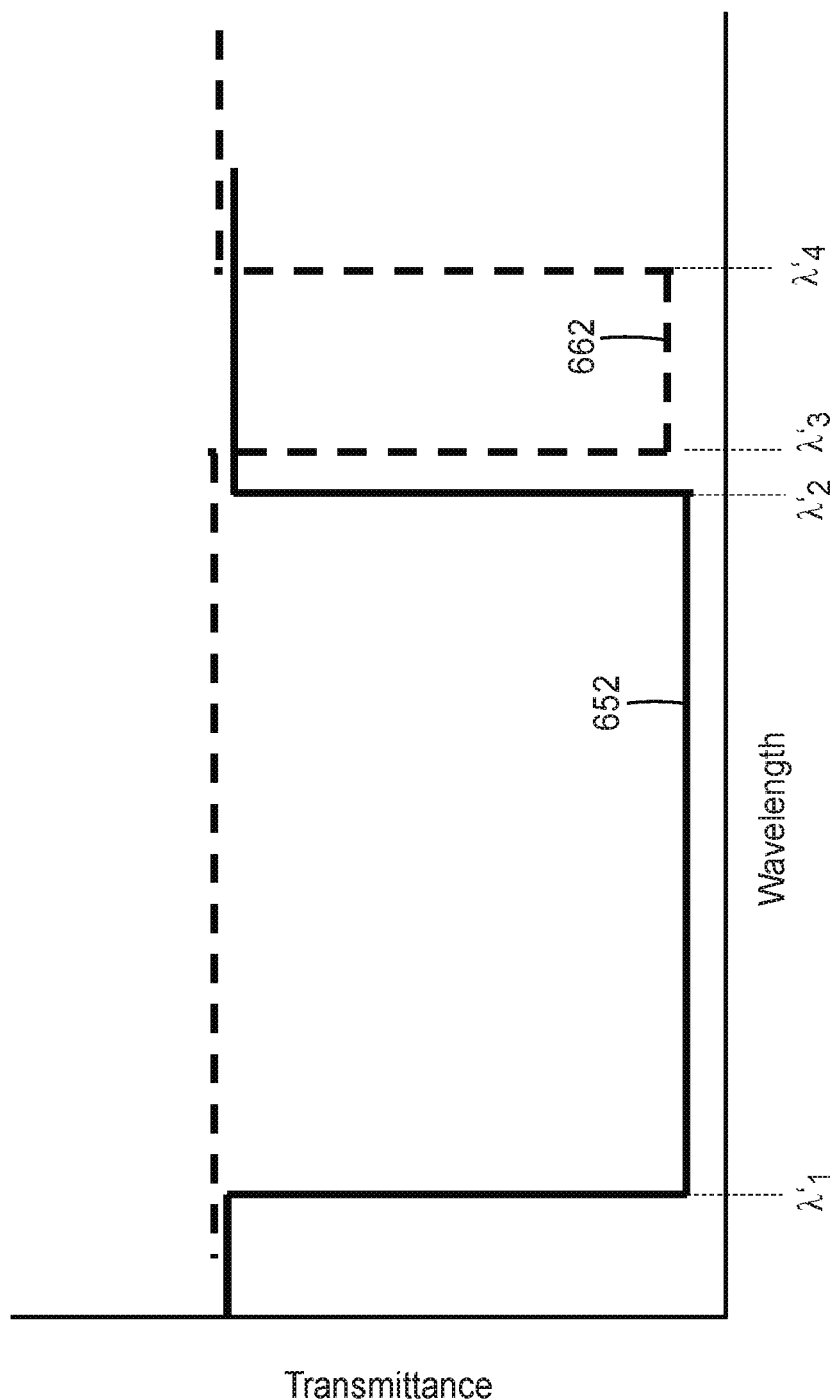

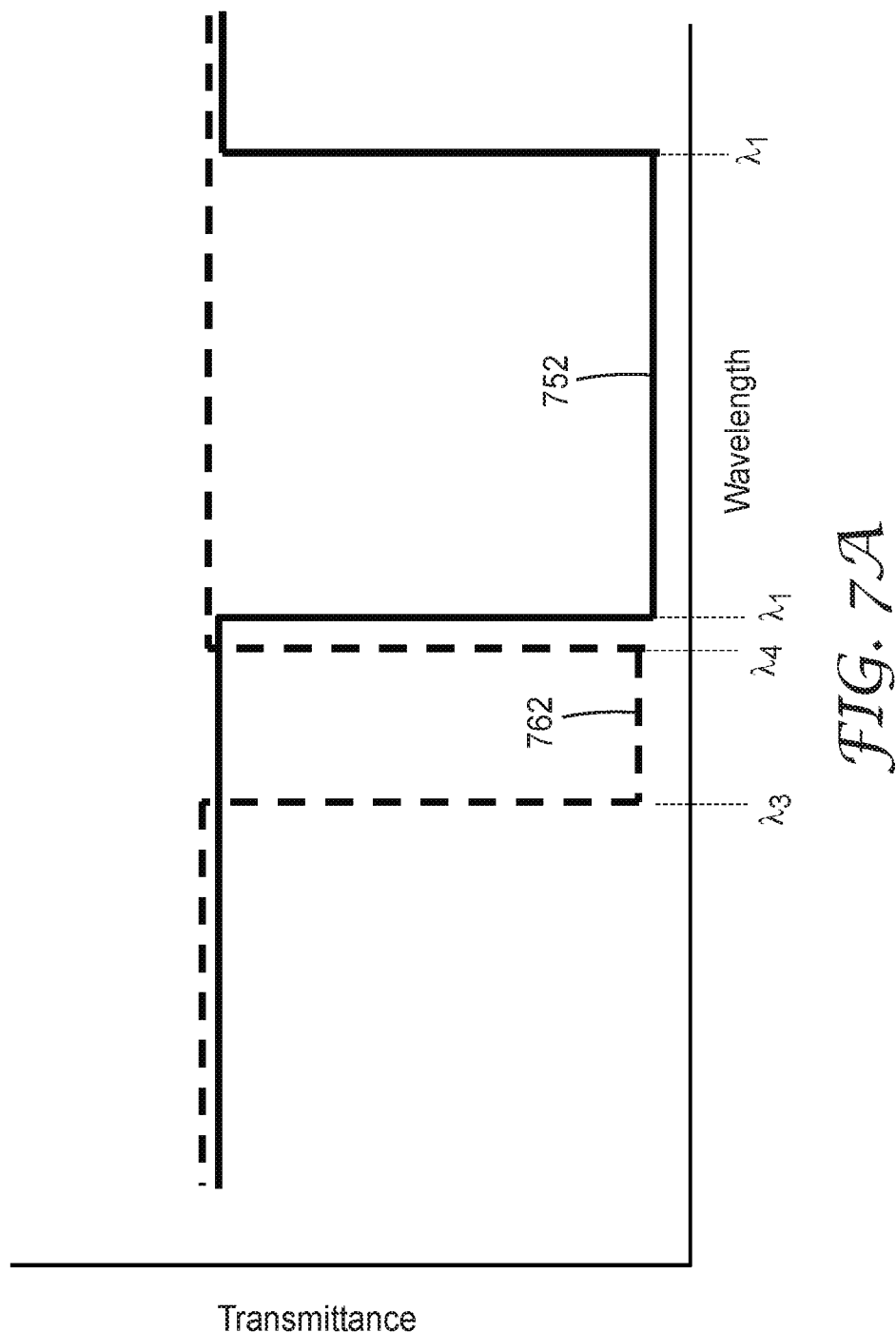

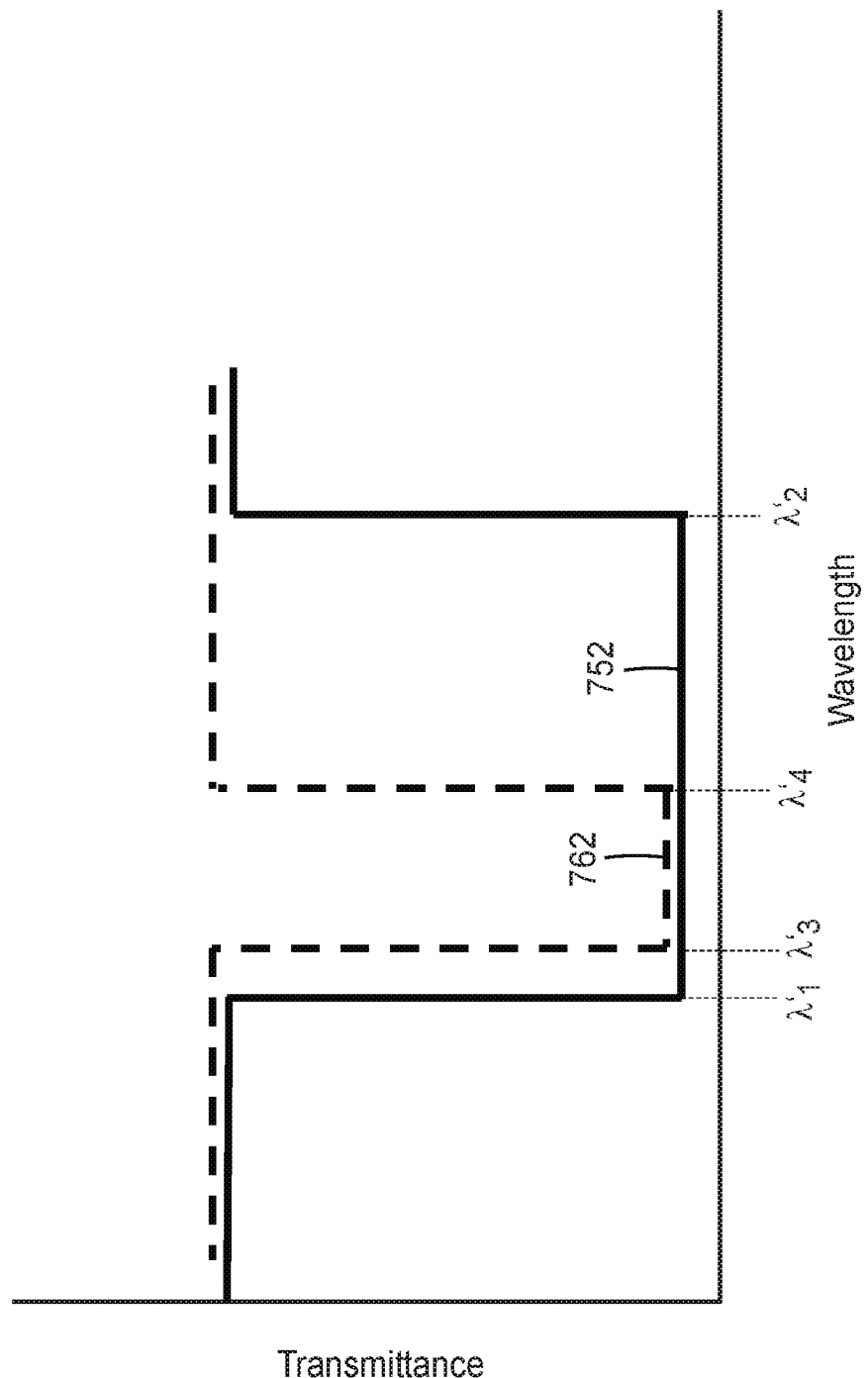

OPTICAL STACK

BACKGROUND

Optical filters can be utilized to selectively transmit light of different wavelengths or different polarizations. Optical filters are useful in a variety of optical systems such as detector systems.

SUMMARY

In some aspects of the present description, an optical stack including an oriented polymeric multilayer optical film and a first non-birefringent optical filter disposed adjacent the multilayer optical film is provided. The oriented polymeric multilayer optical film has a first reflection band with a first band edge having a variation across a length or a width of the multilayer optical film. The first band edge, at normal incidence, has a design wavelength λ and a characteristic deviation about the design wavelength Δ. The first non-birefringent optical filter has a first blocking band which, at normal incidence, comprises wavelengths between λ−Δ/2 and λ+Δ/2. At normal incidence, the first reflection band includes a wavelength range having a width of at least Δ that is outside of the first blocking band.

In some aspects of the present description, an optical stack including an oriented polymeric multilayer optical film and a first non-birefringent optical filter disposed adjacent the multilayer optical film is provided. The oriented polymeric multilayer optical film has a first reflection band with a first band edge at normal incidence at an undesired band edge wavelength. The first non-birefringent optical filter has a first blocking band which, at normal incidence, comprises the undesired band edge wavelength and has a second band edge at a first desired band edge wavelength.

In some aspects of the present description, an optical stack including an oriented polymeric multilayer optical film and a first non-birefringent optical filter disposed adjacent the multilayer optical film is provided. The oriented polymeric multilayer optical film has a first reflection band having a first band width at normal incidence and having a first band edge that has a first shift between normal incidence and an incidence angle of 60 degrees. The first non-birefringent optical filter has a first blocking band having a second band width at normal incidence and having a second band edge that has a second shift between normal incidence and an incidence angle of 60 degrees. The first shift is different from the second shift.

In some aspects of the present description, an optical system including the optical stack is provided. The optical system includes one or both of a light source and a sensor in optical communication with the optical stack.

In some aspects of the present description, an optical system including an oriented polymeric multilayer optical film having a first reflection band with a first band edge, and a light source in optical communication with the oriented polymeric multilayer optical film is provided. The light source is configured to produce light in an output band. In some cases, the first reflection band overlaps the output band at normal incidence, but not at an oblique incidence angle. In some cases, the first reflection band overlaps the output band at an oblique incidence angle, but not at normal incidence.

In some aspects of the present description, an optical system including an oriented polymeric multilayer optical film having a first reflection band with a first band edge, and a sensor in optical communication with the oriented polymeric multilayer optical film is provided. The sensor is configured to receive light in an input band. In some cases, the first reflection band overlaps the input band at normal incidence, but not at an oblique incidence angle. In some cases, the first reflection band overlaps the input band at an oblique incidence angle, but not at normal incidence.

In some aspects of the present description, a method of modifying a first reflection band of an oriented polymeric multilayer optical film is provided. The method includes the steps of providing the oriented polymeric multilayer optical film having the first reflection band, the first reflection band having a band edge at a first wavelength at normal incidence; determining a desired normal incidence band edge wavelength; selecting a non-birefringent optical filter having a first blocking band, the first blocking band having the desired normal incidence band edge wavelength and including the first wavelength at normal incidence; and positioning the non-birefringent reflector in optical communication with the oriented polymeric multilayer optical film.

BRIEF DESCRIPTION OF THE DRAWINGS

FIGS. 1A-1D are schematic cross-sectional views of optical stacks;

FIG. 2 is a schematic cross-sectional view of an optical stack having a spatially variant layer;

FIG. 3B is a plot of transmittance at normal incidence through the oriented polymeric multilayer optical film of FIG. 3A and through a non-birefringent optical filter as a function of wavelength;

FIGS. 4A-7B are plots of transmittance as a function of wavelength for reflection bands and absorbing bands of optical stacks;

DETAILED DESCRIPTION

Figure 1A:
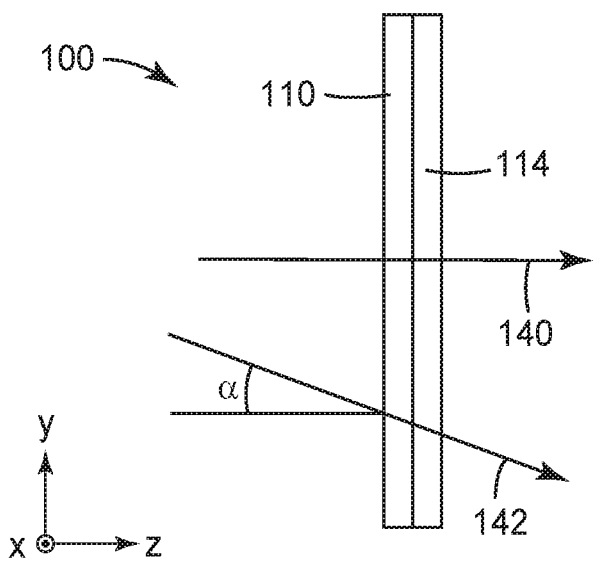

In the following description, reference is made to the accompanying drawings that forms a part hereof and in which various embodiments are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Oriented polymeric multilayer optical films are useful in a wide variety of applications such as reflective polarizers or mirrors in backlight systems and optical filters in detector systems. Such films can be designed to have reflection bands in a wide variety of wavelength ranges depending on the intended application.

Oriented polymeric multilayer optical films having a reflection band often exhibit variation in one or both band edges of the reflection band. This variation can be objectionable is some applications. According to the present description, it has been found that utilizing an optical stack that includes both an oriented (and thus birefringent) polymeric multilayer optical film and a non-birefringent optical filter can provide a substantially reduced (e.g., by at least 60 percent, or by at least 70 percent, or by at least 80 percent) band edge variation compared to the oriented polymeric multilayer optical film alone while providing a wide blocking band (e.g., a reflection band) that would not be easily obtained with a non-birefringent optical filter alone.

The combination of the oriented polymeric multilayer optical film and the non-birefringent optical filter results in an overall blocking band for the optical stack. The oriented polymeric multilayer optical film is typically a reflector for one or both of two orthogonal polarization states. The non-birefringent optical filter has a blocking band that can be a reflection band (e.g., utilizing alternating non-birefringent layers having different refractive indices) or an absorbing band (e.g., utilizing dyes or pigments which absorb in a desired wavelength range). In some embodiments, the non-birefringent optical filter is reflective and the overall blocking band is a reflection band, and in some embodiments the non-birefringent optical filter is absorptive and the overall blocking band is absorptive in some wavelengths and reflective at other wavelengths.

In some embodiments, the optical stacks of the present description have an overall blocking band which has a designed shift with incidence angle. Such optical stacks can create an angle selective element for certain wavelengths that can be used to provide an angle limited reception zone for a sensor, to provide a limited angle of emission for a light source, or to provide a limited angle of view for a marker, for example.

The optical stacks of the present description further provide a way to produce a customized blocking band without incurring the expense of producing a custom designed oriented polymeric multilayer optical film. The non-birefringent filter (or filters) can be selected to have a blocking band which overlaps a band edge (or both band edges) of a reflection band of an oriented polymeric multilayer optical film and which extends in to a desired band edge to provide a customized blocking band.

Figure 1B:
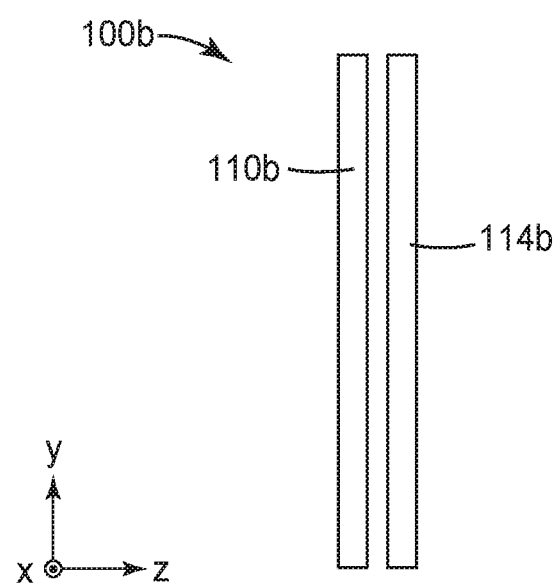

FIG. 1A is a schematic cross-sectional view of optical stack 100 including first and second layers 110 and 114. One of the first and second layers 110 and 114 is an oriented polymeric multilayer optical film and the other of the first and second layers 110 and 114 is a non-birefringent optical filter. Light 140 is incident on the first layer 110 and the second layer 114 at normal incidence, while light 142 is incident on the first layer 110 at an oblique incidence angle of α (angle between light ray and normal vector to the first layer 110). The light 140 or 142 may be transmitted first through the oriented polymeric multilayer optical film and then through the non-birefringent optical filter, or the light 140 or 142 may be transmitted first through the non-birefringent optical filter and then through the oriented polymeric multilayer optical film. The first and second layers 110 and 114 may be disposed immediately adjacent each other as illustrated in FIG. 1A, or an air gap or an intermediate layer may be disposed between the first and second layers as illustrated in FIGS. 1B and 1C, respectively.

The wavelength of a band edge of a reflection band or of a blocking band of interference filters typically depends on incidence angle α and typically shifts to lower wavelengths with increasing incidence angles. Incidence angle or angle of incidence refers to the angle between an incident light ray and a normal to the surface on which the light ray is incident (e.g., oblique incidence angle α of light 142). Normal incidence refers to a zero incidence angle. Properties of reflection bands or blocking bands, such as band edge wavelengths, may be specified at normal incidence or at an oblique incidence angle. The oblique incidence angle used in comparing shifts of reflection or blocking bands from the corresponding bands at normal incidence can be selected to be 45 degrees or 60 degrees, for example.

The oriented polymeric multilayer optical film may be a mirror film or a reflective polarizer film, for example. The oriented polymeric multilayer optical film has a first reflection band having a first band edge (e.g., left band edge) and may also have a second band edge (e.g., right band edge). The oriented polymeric multilayer optical film may also have a second reflection band (e.g., a higher order harmonic of the first reflection band). In some embodiments, the oriented polymeric multilayer optical film is a comb filter having a plurality of reflection bands with pass bands between the reflection bands. The oriented polymeric multilayer optical film and the non-birefringent optical filter can be made using any of the techniques described elsewhere herein.

The non-birefringent optical filter can be any filter in which the optically active layer(s) have isotropic refractive indices. Examples include interference filters having a plurality of alternating layers of differing isotropic refractive indices, as described further elsewhere herein, and include filters having an absorbing layer (e.g., dye or pigment layer) with isotropic complex refractive indices. Isotropic dyes or pigments may be considered a non-birefringent optical filter even if the dyes or pigments are disposed on or in an oriented substrate. Non-isotropic dyes or pigments, such as the iodine layer in an iodine stained polyvinyl alcohol absorbing polarizer, are not non-birefringent optical filters, as used herein, since the iodine molecules are oriented and provide a birefringent complex refractive index that is different in the x- and y-directions (referring to the x-y-z coordinate system of FIG. 1A).

The wavelength ranges of the reflection and blocking bands can be selected based in the intended application. In some embodiments, one or all of the band edges are located, at normal incidence, in a range of 300 nm, or 400 nm to 2500 nm, or 2000 nm, or 1200 nm, or 900 nm, or 700 nm.

FIG. 1B is a schematic cross-sectional view of optical stack 100b including first and second layers 110b and 114b with an air gap therebetween. One of the first and second layers 110b and 114b is an oriented polymeric multilayer optical film and the other of the first and second layers 110b and 114b is a first non-birefringent optical filter.

FIG. 1C is a schematic cross-sectional view of optical stack 100c including first, second and third layers 110c, 114c and 116c. One of the first, second and third layers 110c, 114c and 116c is an oriented polymeric multilayer optical film and a different one of the first, second and third layers 110c, 114c and 116c is a first non-birefringent optical filter. The remaining layer may be an adhesive layer, for example, and/or may be a second non-birefringent optical filter (e.g., a dyed adhesive layer). In some embodiments, first layer 110c is an oriented polymeric multilayer optical film, second layer 114c is a first non-birefringent optical filter, and third layer 116c is an intermediate layer. In some embodiments, the intermediate layer is an adhesive layer, and in some embodiments, the intermediate layer includes one or more dyes or pigments which may include one or more polarizing dyes or pigments. In some embodiments, the intermediate layer is an oriented polymeric layer such as oriented polyethylene terephthalate (PET).

FIG. 1D is a schematic cross-sectional view of optical stack 100d including first and second layers 110d and 114d. One of the first and second layers 110d and 114d is an oriented polymeric multilayer optical film and the other of the first and second layers 110d and 114d is a first non-birefringent optical filter. Optical stack 100d is curved about one axis (the x-axis) or about two orthogonal axes (the x-axis and the y-axis). Optical stack 100d can be formed using a thermoforming process or an in-mold forming process. In some embodiments, first and second layers 110d and 114d are formed as separate layers which are subsequent formed (e.g., thermoformed) into the curved shape illustrated in FIG. 1D. In some embodiments, an in-mold process is used where the oriented polymeric multilayer optical film is prepared and placed into a mold and a material with a wavelength selective dye or pigment is injected into the mold to form the non-birefringent optical filter. Additional layers may be formed between the oriented polymeric multilayer optical film and the non-birefringent optical filter. In some embodiments, the in-mold forming results in an oriented polymeric multilayer optical film curved about at least one axis (e.g., curved about two orthogonal axes). In other embodiments, the in-mold forming results in a flat oriented polymeric multilayer optical film.

FIG. 2 is a schematic cross-sectional view of optical stack 200 including first and second layers 210 and 214. One of the first and second layers 210 and 214 is an oriented polymeric multilayer optical film and the other of the first and second layers 210 and 214 is a non-birefringent optical filter. The first layer 210 is spatially variant and includes holes or discontinuities 218. In some embodiments, first layer 210 is an oriented polymeric multilayer optical film and holes or discontinuities 218 are holes through the oriented polymeric multilayer optical film that can be formed by die cutting, for example. In some embodiments, first layer 210 is a non-birefringent optical filter and holes or discontinuities 218 are discontinuities which can be formed by using a mask in depositing the non-birefringent optical filter. For example, the non-birefringent optical filter can be formed by depositing an absorbing material or depositing a reflective stack of alternating layers onto a substrate or directly onto the oriented polymeric multilayer optical film. The depositing can be done through a mask resulting in a patterned non-birefringent optical filter. The depositing can include printing or spraying an absorbing material, or sputtering or vapor depositing a reflective stack of alternating layers, for example. In some embodiments, first layer 210 is a non-birefringent optical filter that is discontinuous across a length or a width of the non-birefringent optical filter.

In some embodiments, an optical stack includes an oriented polymeric multilayer optical film having a reflection band with a first band edge having a variation across a length or a width of the multilayer optical film, and a first non-birefringent optical filter having a blocking band and being disposed adjacent the multilayer optical film. Such reflection and blocking bands are schematically illustrated in FIGS. 3A-3D.

Figure 3A:
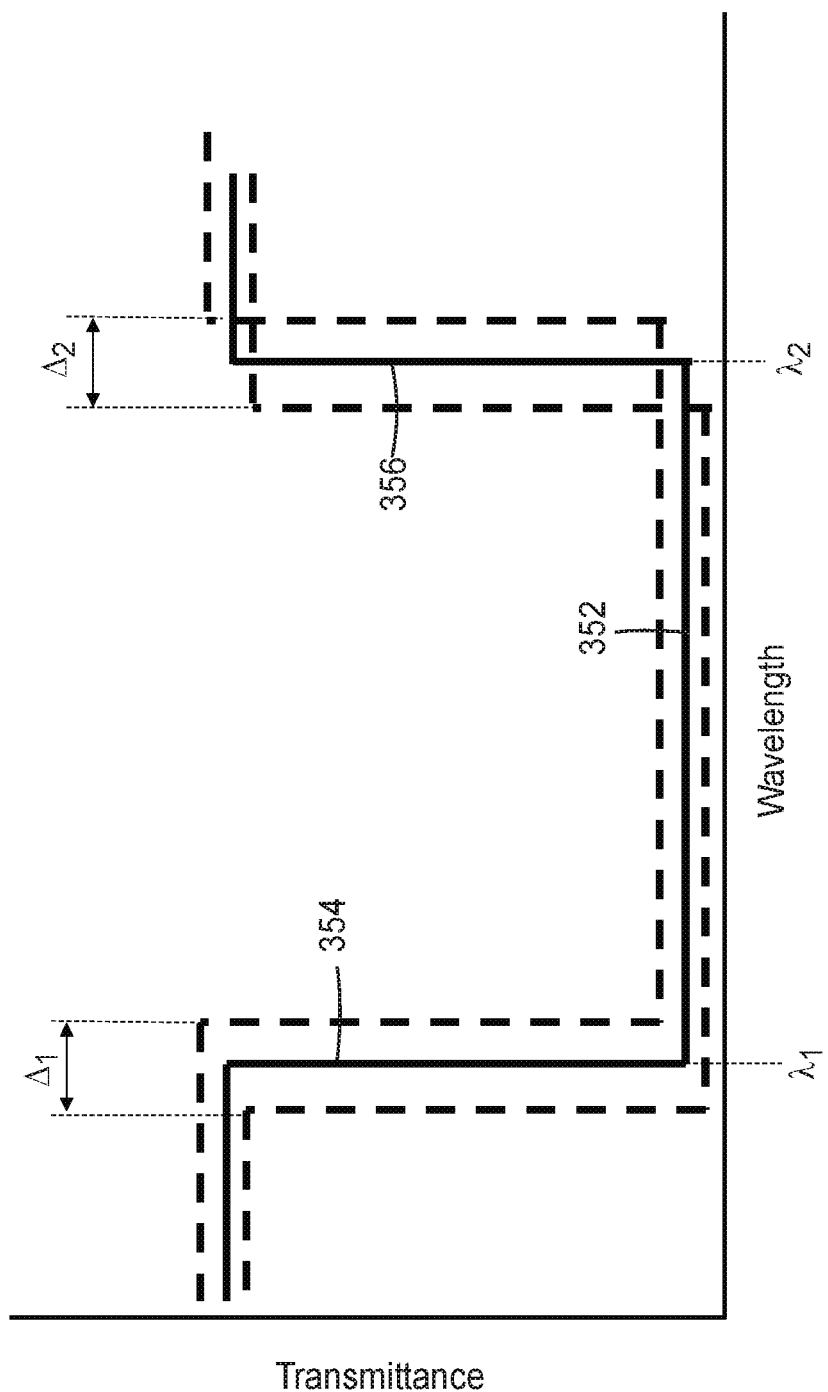
FIG. 3A is a plot of transmittance at normal incidence through an oriented polymeric multilayer optical film as a function of wavelength.

FIG. 3A is a plot of transmittance at normal incidence through an oriented polymeric multilayer optical film as a function of wavelength and provides a schematic illustration of a first reflection band 352 of the oriented polymeric multilayer optical film. First reflection band 352 exhibits a variation across a length or a width (for example, the length of the film may be the dimension along the y-direction and the width of the film may be the dimension along the x-direction, referring to the x-y-z coordinate system illustrated in FIGS. 1A-2) of the multilayer optical film indicated in the figure by the dashed lines. First reflection band 352 has first and second band edges 354 and 356 having design or nominal wavelengths of $\lambda_1$ and $\lambda_2$, respectively, and characteristic deviations about the design wavelengths of $\Delta_1$ and $\Delta_2$, respectively. Unless specified differently, the characteristic deviations $\Delta_1$ and $\Delta_2$ refer to the standard deviation of the first and second band edge wavelengths, respectively, about the design or nominal wavelengths $\lambda_1$ and $\lambda_2$, respectively.

FIG. 3B is a plot of transmittance at normal incidence through the oriented polymeric multilayer optical film of FIG. 3A and through a non-birefringent optical filter as a function of wavelength, and provides a schematic illustration of a first blocking band 362 of the non-birefringent optical filter. The first blocking band 362, which can be an absorbing band or a reflection band, has first and second band edges 364 and 366, respectively. The first band edge 364 is at a wavelength lower than $\lambda_1 - \Delta_1/2$, and the second band edge 366 is at a wavelength higher than $\lambda_1 + \Delta_1/2$. The first reflection band 352 includes a wavelength range 358 which has a width of at least $\Delta_1$ that is outside of the first blocking band 362. The wavelength range 358 identified in FIG. 3B extends from the second band edge 366 to the design or nominal wavelength $\lambda_2$.

Figure 3C:
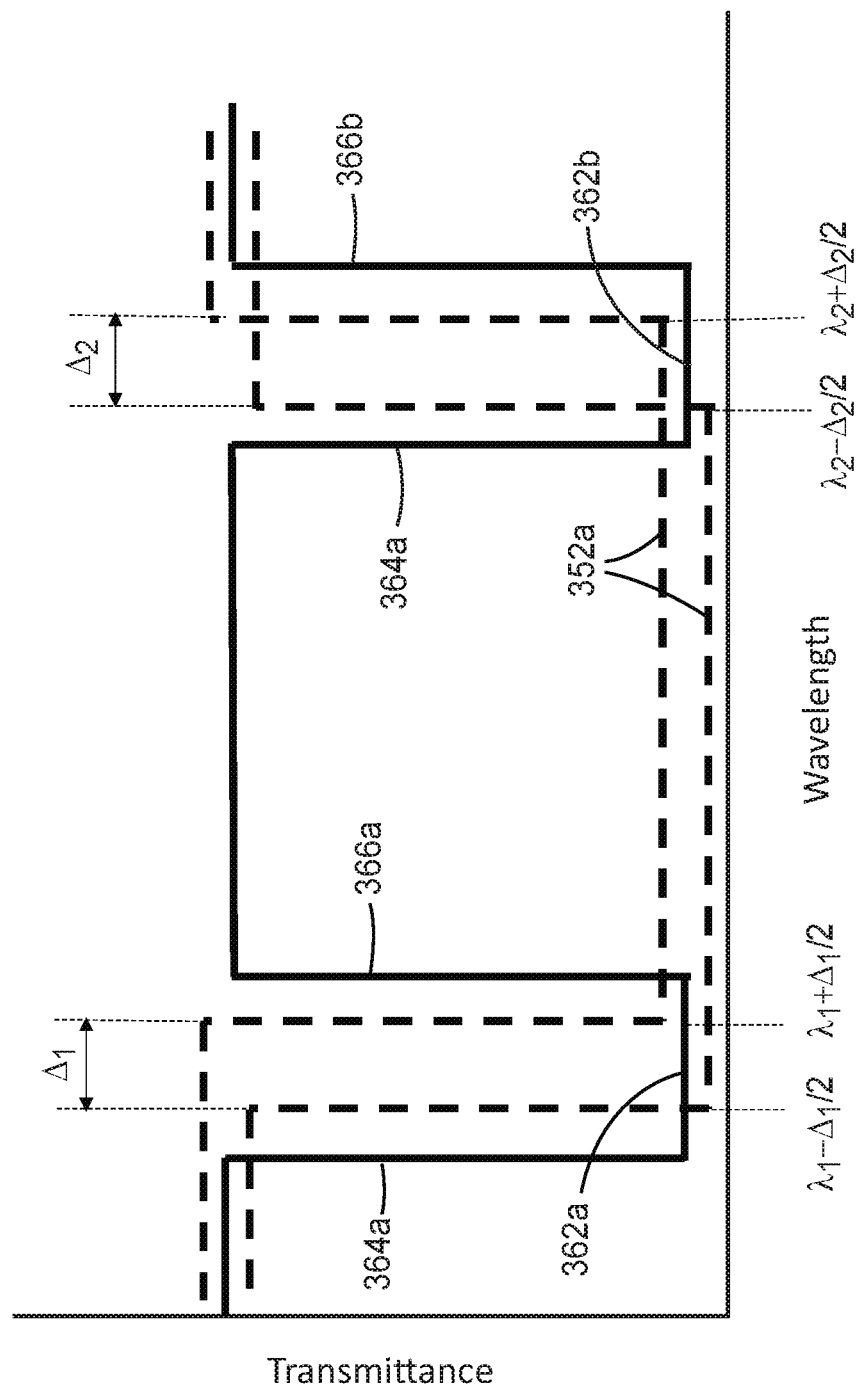
FIG. 3C is a plot of transmittance at normal incidence through the oriented polymeric multilayer optical film of FIG. 3A and through one or two non-birefringent optical filters as a function of wavelength.

FIG. 3C is a plot of transmittance at normal incidence through the oriented polymeric multilayer optical film of FIG. 3A and through one or two non-birefringent optical filters as a function of wavelength, and provides a schematic illustration of first and second blocking bands 362a and 362b of the one or two non-birefringent optical filters. In some embodiments, two distinct non-birefringent optical filters are used with one filter providing the first blocking band 362a and the other filter used to provide the second blocking band 362b. In some embodiments, more than two non-birefringent optical filters are included in the optical stack. For example, in some applications it may be desired to block light in one or more wavelength ranges outside of the ranges of any of the bands 352, 362a and 362b. In some embodiments, a single non-birefringent optical filter having two or more blocking bands are used to provide both the first blocking band 362a and the second blocking band 362b. For example, the first and second blocking bands 362a and 362b may be reflection bands which are different order harmonics provided by alternating non-birefringent first and second layers. For example, the second blocking band 362b may be a primary reflection band and the first blocking band 362a may be a second order harmonic of the second blocking band 362b.

Figure 3D:
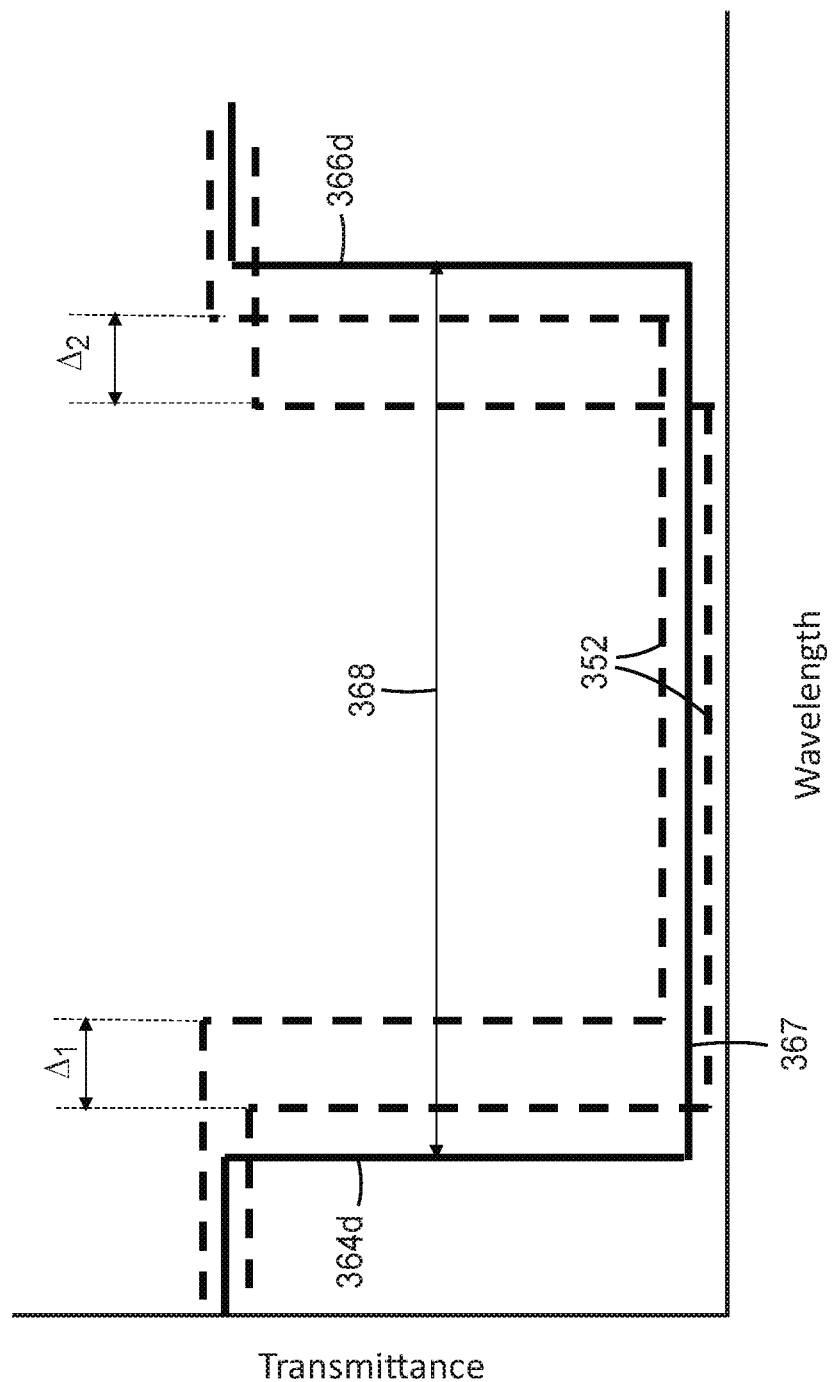
FIG. 3D is schematic illustration of an overall blocking band of an optical stack at normal incidence.

FIG. 3D is schematic illustration of an overall blocking band 367 provided by the combination of the first reflection band 352 and the first and second blocking bands 362a and 362b illustrated in FIG. 3C. In some embodiments, the optical filter includes one but not both of the first and second blocking bands 362a and 362b. In some embodiments, the first non-birefringent optical filter is a non-birefringent reflector and the overall blocking band 367 is an overall reflection band. The overall blocking band 367 has a third band width 368 at normal incidence which is greater than the first band width ($\lambda_2 - \lambda_1$) of the first reflection band 352 at normal incidence. In some embodiments, the overall blocking band 367 has a third band width 368 at normal incidence which is greater than the first band width ($\lambda_2 - \lambda_1$) of the first reflection band 352 at normal incidence by a factor of at least 1.3 or at least 1.5. The overall blocking band 367 has first and second band edges 364d and 366d established primarily by the first band edge 364a of the first blocking band 362a and the second band edge 366b of the second blocking band 362b. As described further elsewhere herein, in some embodiments, one or both of first and second band edges 364d and 366d has a shift between normal incidence and an oblique incidence angle (e.g., 45 or 60 degrees) that is equal to the corresponding shift in the first band edge 364a or the second band edge 366b. The shift between normal incidence normal incidence and the oblique incidence angle of one or both of first and second band edges 364d and 366d may be different from a corresponding shift in the first and second band edges 354 and 356 of the first reflection band 352.

In some embodiments, an optical stack includes an oriented polymeric multilayer optical film having a first reflection band (e.g., reflection band 352) with a first band edge (e.g., band edge 354 or band edge 356) having a variation across a length or a width of the multilayer optical film, and a first non-birefringent optical filter disposed adjacent the multilayer optical film. The first band edge, at normal incidence, has a design wavelength $\lambda$ (e.g., wavelength $\lambda_1$ or $\lambda_2$ depicted in FIG. 3A) and a characteristic deviation about the design wavelength 4 (e.g., wavelength 41 or 42 depicted in FIG. 3A). The first non-birefringent optical filter has a first blocking band (e.g., blocking band 362 depicted in FIG. 3B or blocking band 362b depicted in FIG. 3C), the first blocking band, at normal incidence, including wavelengths between $\lambda-\Delta/2$ and $\lambda+\Delta/2$. At normal incidence, the first reflection band includes a wavelength range having a width (e.g., the width of the wavelength range 358 depicted in FIG. 3B) of at least 4 that is outside of the first blocking band.

Figure 4A:
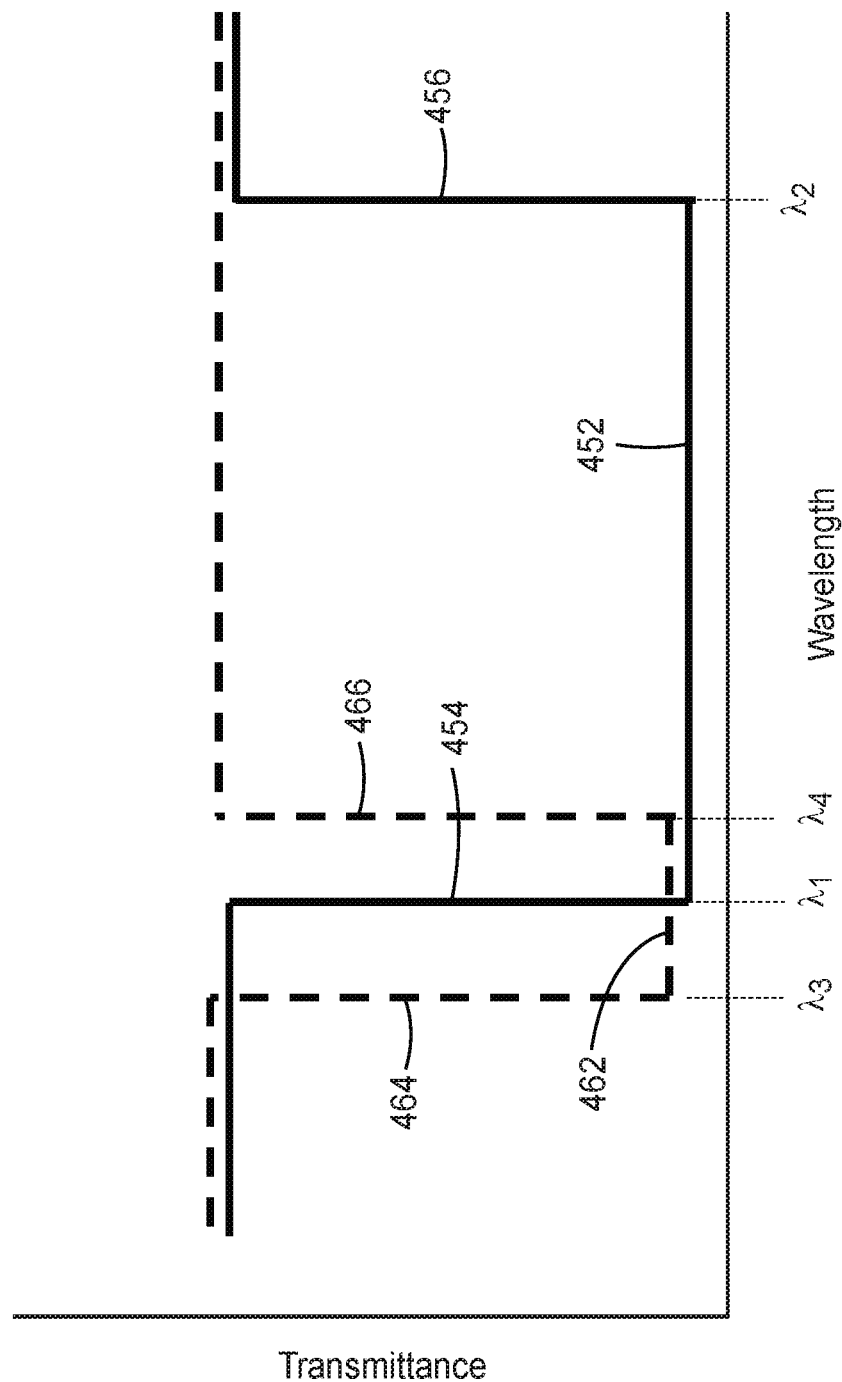

FIG. 4A is a schematic illustration of a first reflection band 452 of an oriented polymeric multilayer optical film and a first blocking band 462 of a non-birefringent optical filter, both at normal incidence. The first reflection band 452 has first and second band edges 454 and 456 at normal incidence at wavelengths of $\lambda_1$ and $\lambda_2$, respectively, and the first blocking band has first and second band edges 464 and 466 at normal incidence at wavelengths of $\lambda_3$ and $\lambda_4$, respectively.

In some cases, the band edge 454 is at an undesired wavelength and the blocking band 462 is utilized to extend the wavelengths blocked by the optical stack to a desired band edge wavelength corresponding to the first band edge 464. In some embodiments, an optical stack includes an oriented polymeric multilayer optical film (e.g., first layer 110) and a first non-birefringent optical filter (e.g., second layer 114) adjacent the multilayer optical film. The oriented polymeric multilayer optical film has a first reflection band 452 with a first band edge 454 at normal incidence at an undesired band edge wavelength $\lambda_1$. The first non-birefringent optical filter has a first blocking band 462 which, at normal incidence, includes the undesired band edge wavelength $\lambda_1$ and has a second band edge 466 at a first desired band edge wavelength $\lambda_3$.

In some embodiments, a method of modifying a first reflection band of an oriented polymeric multilayer optical film is provided. The method includes the steps of: providing the oriented polymeric multilayer optical film (e.g., first layer 110) having the first reflection band 452, the first reflection band 452 having a band edge 454 at a first wavelength $\lambda_1$ at normal incidence; determining a desired normal incidence band edge wavelength $\lambda_3$; selecting a non-birefringent optical filter (e.g., second layer 114) having a first blocking band 462, the first blocking band 462 having the desired normal incidence band edge wavelength $\lambda_3$ and including the first wavelength $\lambda_1$ at normal incidence; and positioning the non-birefringent reflector in optical communication with the oriented polymeric multilayer optical film. The term "optical communication" as applied to two objects means that light can be transmitted from one to the other either directly or indirectly using optical methods (for example, reflection, diffraction, refraction).

Figure 4B:
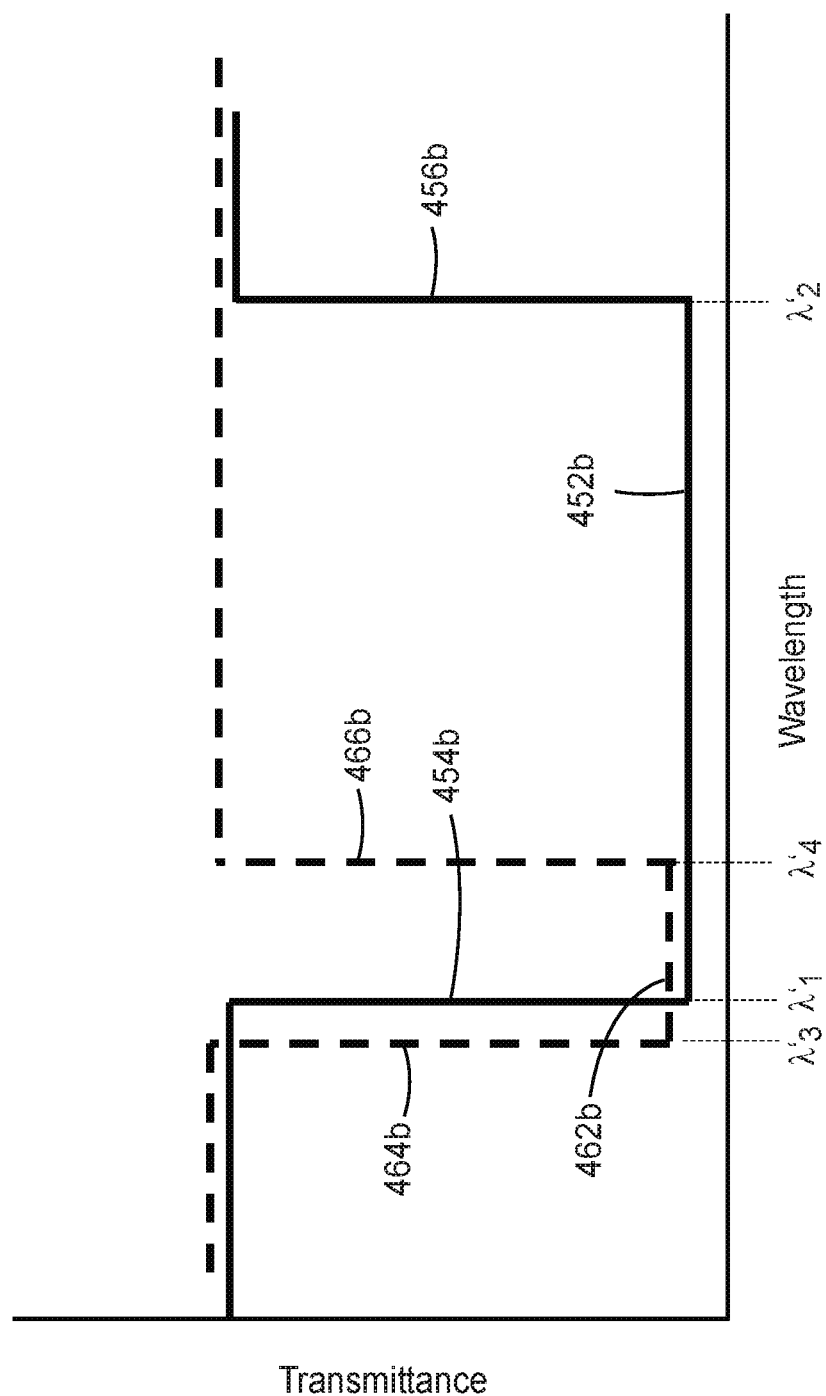
Figure 4C:
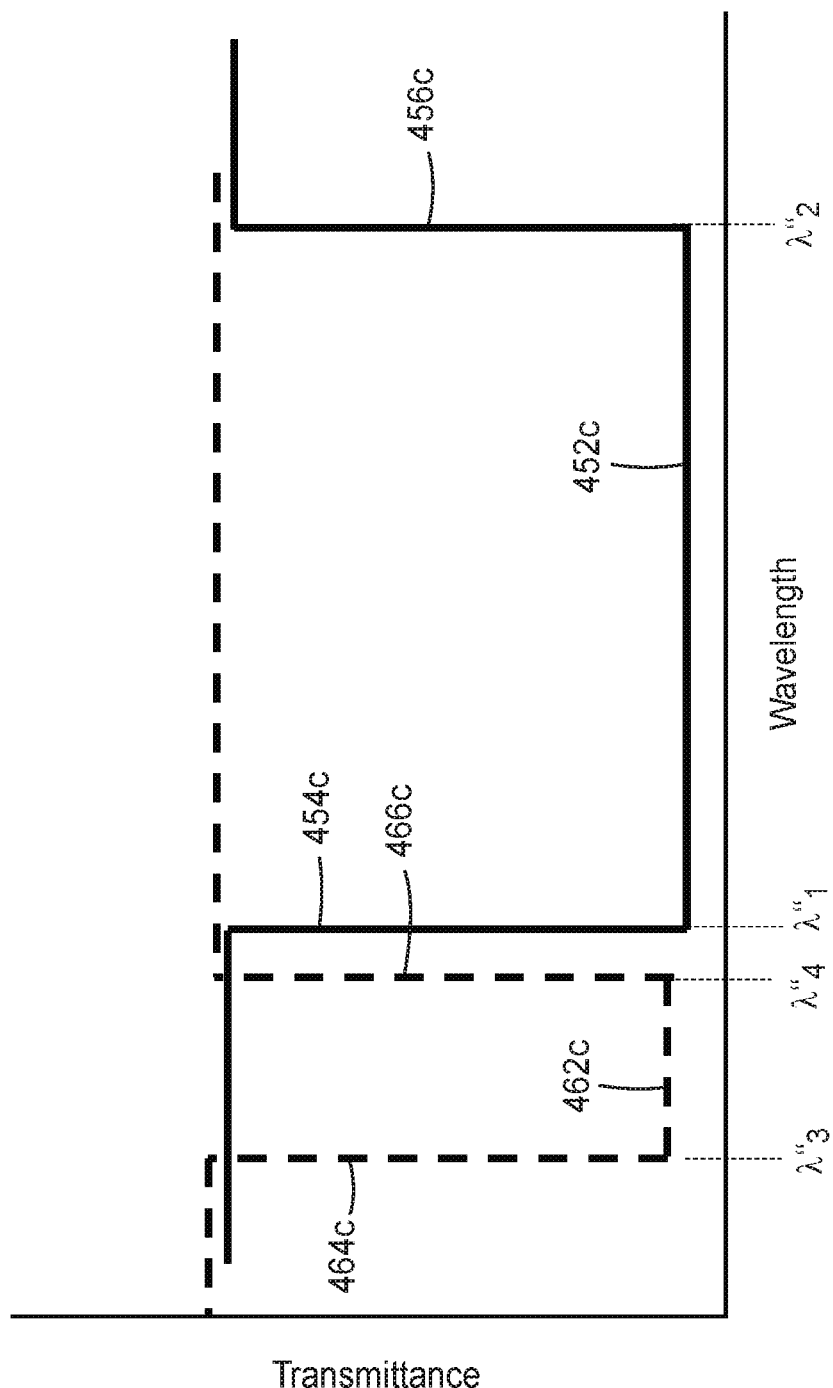

The shifts of the band edges of the reflection and blocking bands depend on the construction of the optical stack (e.g., on the refractive indices uses in the non-birefringent optical filter as described further elsewhere herein). FIGS. 4B and 4C shows the reflection and blocking bands at an oblique angle of incidence for two different embodiments which provide the normal incidence reflection and blocking bands illustrated in FIG. 4A.

FIG. 4B is a schematic illustration of a first reflection band 452b (corresponding to first reflection band 452) and a first blocking band 462b (corresponding to first blocking band 462) at an oblique incidence angle. The first and second band edges 454b and 456b of the first reflection band 452b have shifted from wavelengths of $\lambda_1$ and $\lambda_2$ to wavelengths of $\lambda'_1$ and $\lambda'_2$, respectively, and the first and second band edges 464b and 466b of the first blocking band 462b has shifted from wavelengths of $\lambda_3$ and $\lambda_4$ to wavelengths of $\lambda'_3$ and $\lambda'_4$, respectively. The shift from $\lambda_i$ to $\lambda'_i$ (i.e., the absolute value of the difference in $\lambda_i$ and $\lambda'_i$) for any i from 1 to 4, may the same or different (e.g., the shifts may differ by a factor of at least 1.3 or at least 1.5) from any other shift.

FIG. 4C is a schematic illustration of a first reflection band 452c (corresponding to first reflection band 452) and a first blocking band 462c (corresponding to first blocking band 462) at an oblique incidence angle in an embodiment where the optical stack has the reflection and blocking bands 452 and 462, respectively, illustrated in FIG. 4A at normal incidence, but has differing shifts from the embodiment of FIG. 4B. The first and second band edges 454c and 456c of the first reflection band 452c have shifted from wavelengths of $\lambda_1$ and $\lambda_2$ to wavelengths of $\lambda''_1$ and $\lambda''_2$, respectively, and the first and second band edges 464c and 466c of the first blocking band 462c has shifted from wavelengths of $\lambda_3$ and $\lambda_4$ to wavelengths of $\lambda''3$ and $\lambda''4$, respectively. A passband has opened between $\lambda''_4$ and $\lambda''_1$. In the embodiment illustrated in FIG. 4B, the first reflection band 452b and the first blocking band 462b overlap at both normal and oblique incidence, while in the embodiment illustrated in FIG. 4C, the first reflection band 452c and the first blocking band 462c overlap at normal incidence but not at the oblique angle of incidence. In other embodiments, the first reflection band and the first blocking band overlap at the oblique angle of incidence but not at normal incidence.

The shift of band edge with incidence angle can be controlled by the selection of materials used in the oriented polymeric multilayer optical film and in the non-birefringent optical filter. For example, the refractive indices of alternating layers in the oriented polymeric multilayer optical film can be adjusted to adjust how rapidly the band edge(s) of the reflection band of the multilayer optical film shifts with incidence angle. Higher refractive indices result in lower band edge shifts due to refraction bending the light rays closer to the normal direction which results in a shorter path length through the layer. In some embodiments, the non-birefringent optical filter includes a plurality of alternating layers (e.g., of the form . . . ABABABA . . . ) as described further elsewhere herein. The alternating layers can be alternating inorganic layers (both A and B inorganic), alternating polymeric layers (both A and B polymeric), or a polymeric layer alternating with an inorganic layer (one of A and B inorganic and the other polymeric). In some embodiments, lower refractive index materials are used for the non-birefringent optical filter than for the oriented polymeric multilayer optical film and the blocking band of the non-birefringent optical filter shifts more rapidly with incidence angle than the reflection band of the oriented polymeric multilayer optical film. Utilizing an inorganic material for at least one of A and B allows a higher refractive index material to be used than what is typically available for oriented polymeric layers. This allows a non-birefringent optical filter to be constructed which has a band shift smaller than that of the oriented polymeric multilayer optical film.

In some embodiments, an optical stack includes an oriented polymeric multilayer optical film having a first reflection band (e.g., reflection band 452 or 453b) having a first band width ($\lambda_2-\lambda_1$) at normal incidence and having a first band edge (e.g., band edge 454 or 454b) that has a first shift (e.g., $\lambda_1-\lambda'_1$) between normal incidence and an incidence angle of 60 degrees. The optical stack also includes a first non-birefringent optical filter having a first blocking band (e.g., blocking band 462 or 462b) having a second band width ($\lambda_4-\lambda_3$) at normal incidence and having a second band edge (e.g., band edge 464 or 464b) that has a second shift (e.g., $\lambda_3-\lambda'_3$) between normal incidence and an incidence angle of 60 degrees. In some embodiments, the first band width is different from the second band width, and the first shift is different from the second shift. For example, the first band width may be greater than the second band width and the first shift may be greater than the second shift. In this case, the optical stack can provide the wide bandwidth of an oriented polymeric multilayer optical film with the low shift of band edge with incidence angle provided by a non-birefringent interference filter, for example. In some embodiments, the first band width is at least 1.3 or 1.5 times the second band width. In some embodiments, the first shift is at least 1.3 or 1.5 times the second shift. In some embodiments, the first blocking band is an absorbing band that has little or no shift with incidence angle.

Figure 5:
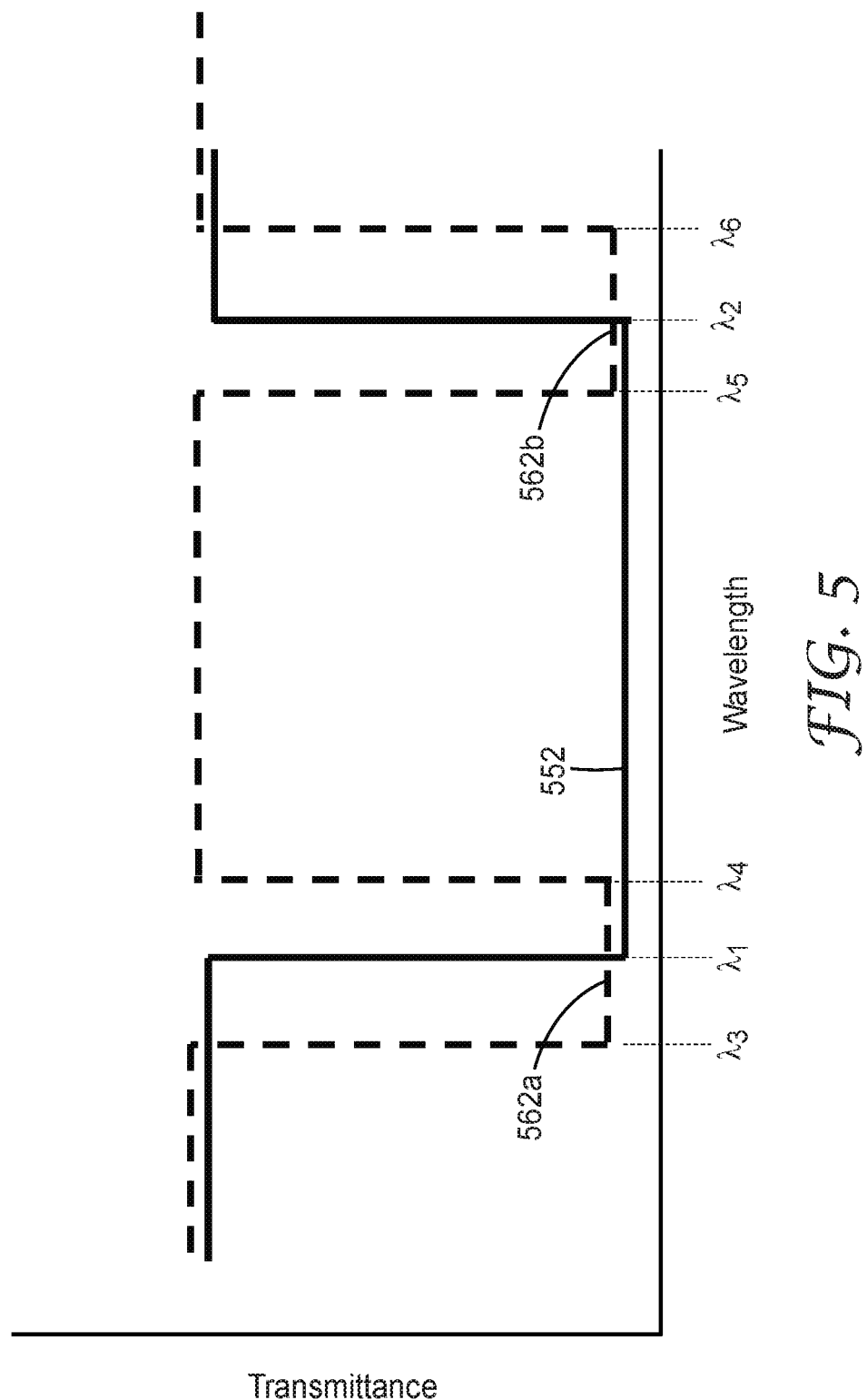

In some embodiments, the non-birefringent blocking filter includes two blocking bands or two non-birefringent blocking filters each including a blocking band is provided. One or both of the blocking bands may overlap with a band edge of the oriented polymeric multilayer optical film at normal incidence. This is illustrated in FIG. 5 which is a schematic illustration of a first reflection band 552 of an oriented polymeric multilayer optical film and first and second blocking bands 562a and 562b of one or two non-birefringent optical filters, all at normal incidence. In some embodiments, the first reflection band 552 and the first and second blocking bands 562a and 562b shift with incidence angle such that both of the first and second blocking bands 562a and 562b overlap with band edges of the first reflection band 552 at an oblique incidence angle (e.g., 45 or 60 degrees). In other embodiments, the first reflection band 552 and the first and second blocking bands 562a and 562b shift with incidence angle such that one or both of the first and second blocking bands 562a and 562b do not overlap with band edges of the first reflection band 552 at an oblique incidence angle (e.g., 45 or 60 degrees). In still other embodiments, one or both of the first and second blocking bands 562a and 562b do not overlap with a band edge of the first reflection band 552 at normal incidence, but do overlap with a band edge of the first reflection band 552 at an oblique incidence angle.

FIGS. 6A-6B schematically illustrates first reflection band 652 and first blocking band 662 which overlap at normal incidence (shown in FIG. 6A) and which do not overlap at an oblique incidence angle (shown in FIG. 6B). The first reflection band 652 has band edges at $\lambda_1$ and $\lambda_2$ at normal incidence and at $\lambda'_1$ and $\lambda'_2$, respectively, at the oblique incidence angle. The first blocking band 662 has band edges at $\lambda_3$ and $\lambda_4$ at normal incidence and at $\lambda'_3$ and $\lambda'_4$, respectively, at the oblique incidence angle. A passband is present between $\lambda'_2$ and $\lambda'_3$ at the oblique incidence angle. The oblique incidence angle may be 45 degrees or 60 degrees, for example.

FIGS. 7A-7B schematically illustrates first reflection band 752 and first blocking band 762 which do not overlap at normal incidence (shown in FIG. 7A) and which do overlap at an oblique incidence angle (shown in FIG. 7B). The first reflection band 752 has band edges at $\lambda_1$ and $\lambda_2$ at normal incidence and at $\lambda'_1$ and $\lambda'_2$, respectively, at the oblique incidence angle. The first blocking band 762 has band edges at $\lambda_3$ and $\lambda_4$ at normal incidence and at $\lambda'_3$ and $\lambda'_4$, respectively, at the oblique incidence angle. A passband is present between $\lambda_4$ and $\lambda_1$ at normal incidence which is not present at the oblique incidence angle. The oblique incidence angle may be 45 degrees or 60 degrees, for example.

Band shift patterns different from those shown in FIGS. 6A-7B are also possible. In some embodiments, the blocking band partially overlaps the reflection band at normal incidence and extends to the right of a right band edge of the reflection band at normal incidence. In this case, the relative shifts of the band edges can be selected such that the band width of the resulting overall blocking band of the optical stack narrows with increasing incidence angle. In some embodiments, the blocking band partially overlaps the reflection band at normal incidence and extends to the left of a left band edge of the reflection band at normal incidence. In this case, the relative shifts of the band edges can be selected such that the band width of the resulting overall blocking band of the optical stack widens with incidence angle and/or opens a passband (e.g., a passband between $\lambda''_4$ and $\lambda''_1$ is present in FIG. 4C). In some embodiments, the blocking band at least partially overlaps the reflection band at normal incidence and does not extend beyond the reflection band at normal incidence. In this case, the relative shifts of the band edges can be selected such that the overall blocking band expands and/or opens a passband (for example the wavelength range from $\lambda'_2$ to $\lambda'_3$ depicted in FIG. 6B is a passband where transmission is allowed; this passband is not present in FIG. 6A). In some embodiments, the blocking band does not overlap the reflection band at normal incidence and is positioned to the left of the left band edge of the reflection band. In this case, the relative shifts of the band edges can be selected such that the overall blocking band narrows and/or a passband narrows or closes (for example the wavelength range from $\lambda_4$ to $\lambda_1$ depicted in FIG. 7A is a passband where transmission is allowed; this passband is closed in FIG. 7B). In some embodiments, the blocking band does not overlap the reflection band at normal incidence and is positioned to the right of the right band edge of the reflection band. In this case, the relative shifts of the band edges can be selected such that a passband between the reflection band and the blocking band widens with increasing incidence angle.

In some embodiments, the oriented polymeric multilayer optical film has a plurality of reflection bands. In some embodiments, the oriented polymeric multilayer optical film is a comb filter having a plurality of passbands between adjacent reflection bands. In some embodiments, at least some of the passbands shift under the blocking band or shift out from under the blocking band as the angle of incidence varies.

Figure 8:
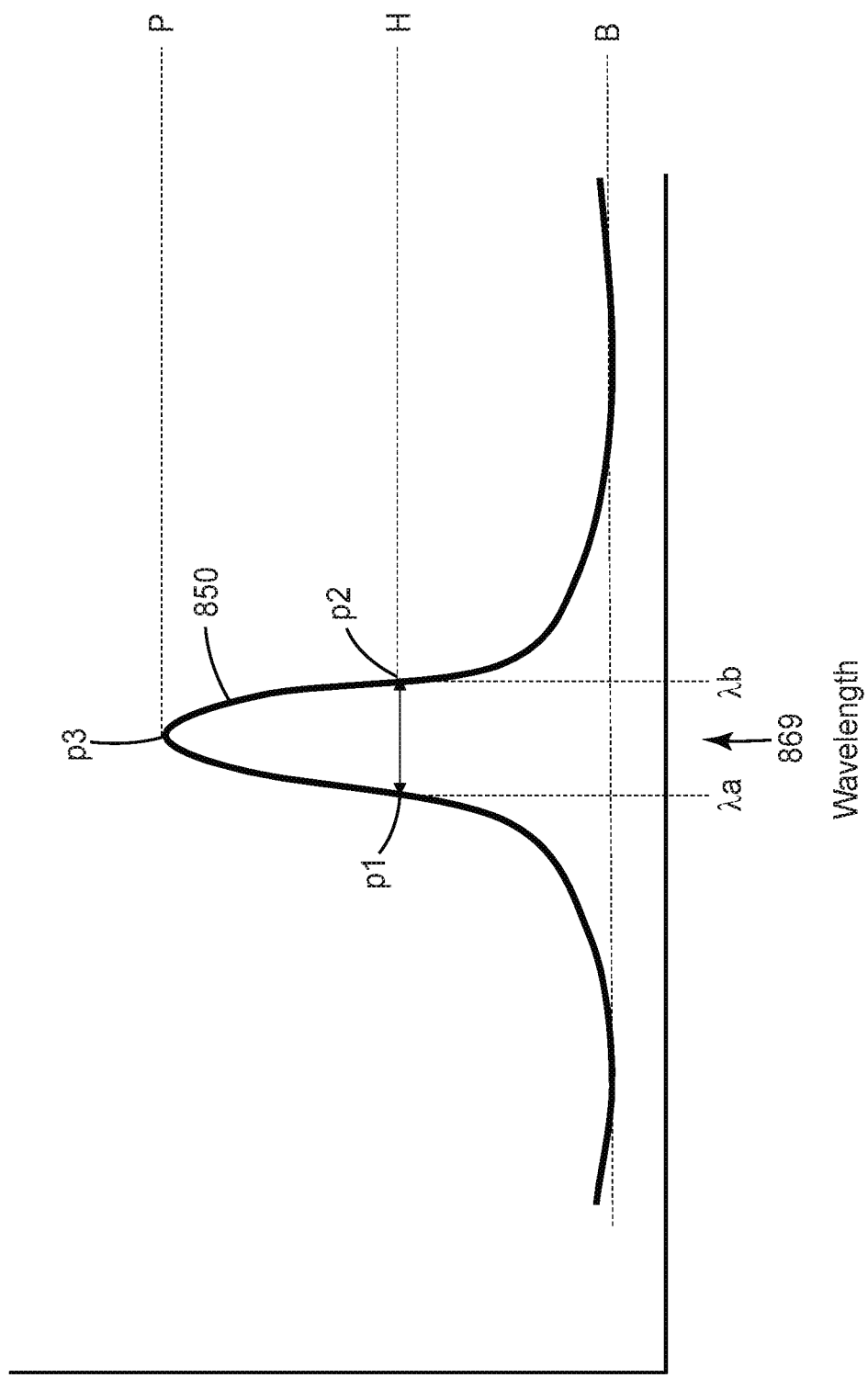
FIG. 8 is a graph illustrating the concept of full-width at half-maximum.

FIG. 8 is a graph illustrating the concept of full-width at half-maximum ("FWHM"). The curve 850 represents a function of wavelength that can correspond to a transmittance, 1 minus a transmittance, an absorbance, a reflectance, an output spectrum of a light source, or an input spectrum of a sensor, for example. In order to quantify relevant features of the curve 850, a baseline value B of the curve 850, a peak value P of the curve 850, and an intermediate value H of the curve 850, halfway between P and B are identified in FIG. 8. The curve 850 intersects with the value H at the points p1 and p2, whose wavelength values equal the short wavelength band edge $\lambda a$ and the long wavelength band edge $\lambda b$, respectively, of the band 869. The short and long wavelength band edges can be used to calculate two other parameters of interest: the width (full-width at half-maximum, or "FWHM") of the band 869, which equals $\lambda b - \lambda a$; and the center wavelength of the band 869, which equals $(\lambda a + \lambda b)/2$. Note that the center wavelength may be the same as or different from the peak wavelength (point p3) of the band 869, depending on how symmetrical or asymmetrical the curve 850 is.

In some embodiments, the curve 850 represents 1 minus the transmittance through a non-birefringent optical filter or through an oriented polymeric multilayer optical film. In some embodiments, the curve 850 represents an output band of a light source. In some embodiments, the curve 850 represents an input band for a sensor. In embodiments, where curve 850 represents 1 minus a transmittance of a blocking band or of a reflection band, the value H may be greater than 0.6 (transmittance no more than 0.4 or 40 percent), greater than 0.7 (transmittance no more than 0.3 or 30 percent), greater than 0.8 (transmittance no more than 0.2 or 20 percent), or greater than 0.9 (transmittance no more than 0.1 or 10 percent). The value P may be greater than 0.7 (transmittance no more than 0.3 or 30 percent), greater than 0.8 (transmittance no more than 0.2 or 20 percent), or greater than 0.9 (transmittance no more than 0.1 or 10 percent). The value B may be less than 0.5 (transmittance at least 0.5 or 50 percent), less than 0.4 (transmittance at least 0.6 or 60 percent), less than 0.3 (transmittance at least 0.7 or 70 percent), or less than 0.2 (transmittance at least 0.8 or 80 percent).

Figure 9:
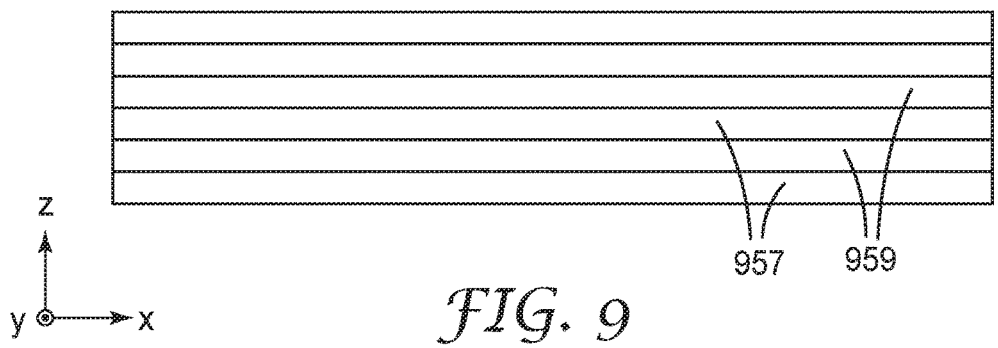
FIG. 9 is a schematic cross-sectional view of an optical filter.

FIG. 9 is a cross-sectional view of filter 913 which includes a plurality of alternating first layers 957 and second layers 959. Filter 913 can be an oriented polymeric multilayer optical film or a non-birefringent optical filter depending on the selection of the first and second layers 957 and 959. In some embodiments, the alternating first and second layers 957 and 959 are alternating polymeric layers having different refractive indices.

In some embodiments, the alternating first and second layers 957 and 959 are alternating polymeric layers where at least one of the first and second layers 957 and 959 are oriented polymeric layers. Such polymeric filters (e.g., mirrors or reflective polarizers) are generally described in U.S. Pat. No. 5,882,774 (Jonza et al.); U.S. Pat. No. 5,962,114 (Jonza et al.); U.S. Pat. No. 5,965,247 (Jonza et. al.); U.S. Pat. No. 6,939,499 (Merrill et al.); U.S. Pat. No. 6,916,440 (Jackson et al.); U.S. Pat. No. 6,949,212 (Merrill et al.); and U.S. Pat. No. 6,936,209 (Jackson et al.); for example, each of which is hereby incorporated by reference herein to the extent that it does not contradict the present description. In brief summary, a polymeric multilayer optical film can be made by coextruding a plurality of alternating polymeric layers (e.g., hundreds of layers), uniaxially or substantially uniaxially stretching the extruded film (e.g., in a linear or parabolic tenter) to orient the film in the case of a polarizer or biaxially stretching the film to orient the film in the case of a mirror.

In some embodiments, a non-birefringent optical filter used in an optical stack is formed by depositing an absorbing material (e.g., by one or more of printing, spraying, and laminating the absorbing material) onto a separate substrate or directly onto the oriented polymeric multilayer optical film. If a separate substrate is used, after depositing the non-birefringent optical filter onto the substrate, the substrate can optionally be laminated to the oriented polymeric multilayer optical film.

In some embodiments, the alternating first and second layers 957 and 959 are alternating non-birefringent layers. The alternating non-birefringent layers can be deposited onto a substrate and the substrate positioned adjacent to (and optionally laminated to) an oriented polymeric multilayer optical film for form an optical stack, or the alternating non-birefringent layers can be deposited directly onto an oriented polymeric multilayer optical film for form an optical stack. In some embodiments, the alternating non-birefringent layers is deposited using one or more of atomic layer deposition, sputtering, chemical vapor deposition, and layer-by-layer self-assembly.

In some embodiments, the alternating first and second layers 957 and 959 are alternating inorganic layers. In this case, the filter 913 may be referred to as a dielectric mirror. Such dielectric mirrors can be made by depositing alternate low and high index layers of inorganic materials using thin-film deposition techniques known in the art. For example, alternating layers of $TiO_2$ and $SiO_2$ can be evaporated onto a substrate or onto an oriented multilayer optical film to provide a reflective non-birefringent optical filter. Other oxides or metal-doped oxides can also be used, including, for example, zinc oxide or metal-doped zinc oxide, and metal-doped silicon oxide. For example, Al-doped ZnO or Al-doped $SiO_x$ can be used as inorganic layers.

In other embodiments, one of the alternating first and second layers 957 and 959 is polymeric and the other of the alternating first and second layers 957 and 959 is inorganic. For example, an inorganic second layer 959 can be vapor deposited or sputtered onto a polymeric first layer 957, then another polymeric first layer 957 can be coated onto the inorganic second layer 959. Another inorganic second layer 959 can then be deposited onto the coated polymeric first layer 957 and the process repeated until a desired number of layers is formed. The polymeric first layers can be formed using a vacuum coater similar to the coater described in U.S. Pat. No. 5,440,446 (Shaw et al.) and U.S. Pat. No. 7,018,713 (Padiyath et al.), both of which are hereby incorporated herein by reference to the extent that they do not contradict the present description, to deposit a monomer layer and curing the monomer layer by exposure to actinic radiation (e.g., ultra-violet radiation). For example, a stack of alternating layers of cured acrylate polymer (e.g., having a refractive index in a range of 1.4 to 1.6) and an oxide (e.g., a metal oxide having a refractive index in a range of 1.8 to 3.0) can be used to provide a reflective non-birefringent optical filter. The oxide can be a metal-doped oxide such as Al-doped ZnO. Refractive index can refer to the refractive index determined at a wavelength of a center of a desired reflection band or at a standard fixed wavelength such as 550 nm, for example.

In other embodiments, a filter 913 having alternating inorganic layers and a different filter 913 having alternating oriented polymeric layers are placed adjacent each other to form an optical stack of the present description. The two filters can be laminated together through an adhesive layer or the inorganic filter can be deposited layer by layer onto the polymeric filter using the layer-by-layer self-assembly methods of U.S. Pat. Pub. No. 2015/0285956 (Schmidt et al.), for example, which is hereby incorporated herein by reference to the extent that it does not contradict the present description.

Whether polymeric or inorganic layers are used, reflection is provided when a pair of adjacent layers (optical repeat unit) has a total optical thickness (physical thickness of a layer times the refractive index of the layer) of half of a wavelength. By adjusting the thickness of the layers through the stack of the layers, a desired reflection band or reflection bands can be provided.

Figure 10A:
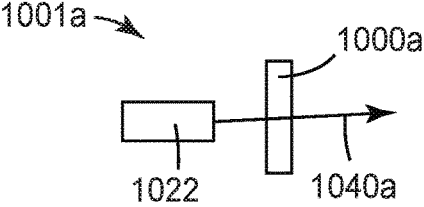
FIGS. 10A-10C are schematic illustrations of optical systems.
Figure 10B:
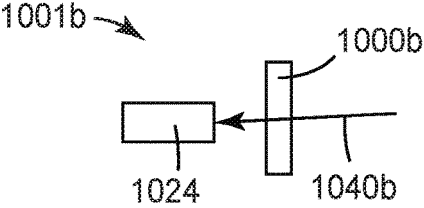

FIG. 10A is a schematic illustration of optical system 1001a including light source 1022 and optical filter 1000a. A light ray 1040a is emitted by the light source 1022 and transmitted through optical filter 1000a. Optical filter 1000a may be any of the optical stacks of the present description or may be an oriented polymeric multilayer optical film having a first reflection band with a first band edge. FIG. 10B is a schematic illustration of optical system 1001b including sensor 1024 and optical filter 1000b. A light ray 1040b is transmitted through optical filter 1000b and is received by the sensor 1024. Optical filter 1000b may be any of the optical stacks of the present description or may be an oriented polymeric multilayer optical film having a first reflection band with a first band edge. Optical filter 1000b may be configured to limit light transmitted into the sensor 1024 to a desired input band for the sensor 1024. In some embodiments, an optical system includes both a light source and a sensor. For example, a light source may be included in optical system 1001b disposed to provide the light ray 1040b which may reflect off of a marker (e.g., a white tee shirt, reflective tape, markers in a sign, license plates such as retroreflective license plates, etc.) before passing through optical filter 1000b or a sensor may be included in optical system 1000a to receive the light ray 1040a directly or after the light ray 1040a has reflected off of a marker, for example. In some embodiments, the optical stacks of the present description are used to provide angular limitations of light passing through the filter. For example, an optical stack can block light emitted by a light source at normal incidence and transmit light of the same wavelength at an oblique incidence angle. As another example, an optical stack can transmit light emitted by a light source at normal incidence and block light of the same wavelength at an oblique incidence angle.

Figure 10C:
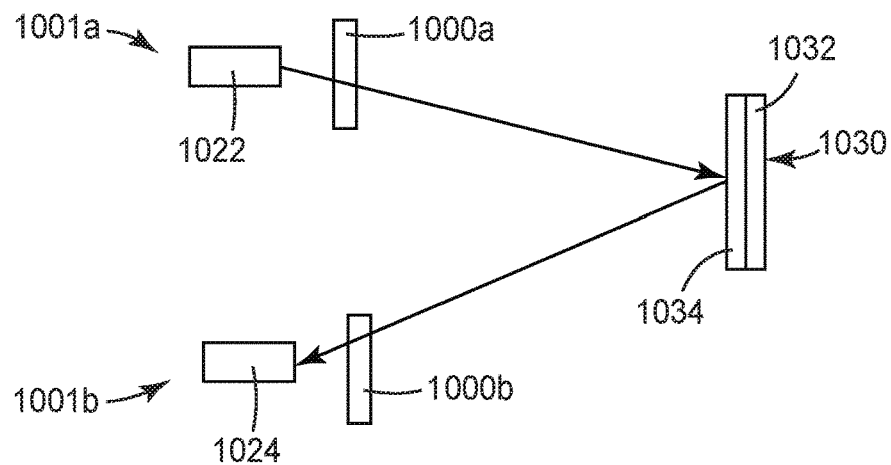

FIG. 10C is a schematic illustration of optical system 1001c which includes the optical systems 1001a and 1001b described in reference to FIGS. 10A-B and which further includes marker 1030 which is in optical communication with light source 1022 and sensor 1024. Marker 1030 includes reflector 1032 and layer 1034. Reflector 1032 may be or may include one or more of a specular reflector, a diffuse reflector, a semi-specular reflector, and a retroreflector. Layer 1034 can be an optical filter suitable for a given application, for example. In some embodiments, layer 1034 is an optical stack of the present description, which can be used, for example, as an angle limiting filter for the marker 1030. In other embodiments, layer 1034 is omitted.

Other uses of optical filters in optical systems are described in U.S. Pat. App. No. 62/347,776 (Wheatley et al.) filed on Jun. 9, 2016 and hereby incorporated herein by reference to the extent that it does not contradict the present description.

In some embodiments, an optical system is provided which includes an optical filter and further includes one or both of a light source and a sensor in optical communication with the optical filter. The optical filter may be any of the optical stacks of the present description or may be an oriented polymeric multilayer optical film having a first reflection band with a first band edge. In some embodiments, the optical system includes the light source which may be configured to produce light in an output band. In some embodiments, the output band is a narrow band (e.g., a band having a full-width at half-maximum of no more than 40 nm). In some embodiments, the light source is a light emitting diode (LED), a laser, or a laser diode, for example. In some embodiments, the optical system includes the sensor which may be configured to receive light in an input band. In some embodiments, the input band is a narrow band (e.g., a band having a full-width at half-maximum of no more than 40 nm) which may be established by an optical bandpass filter disposed at an entrance to the sensor. In some embodiments, the first reflection band of the optical stack overlaps the output band and/or the input band at normal incidence, but not at an oblique incidence angle (e.g., 45 or 60 degrees). For example, the first reflection band may correspond to reflection band 652 and the output band and/or the input band may be in a wavelength range of $\lambda_3$ to $\lambda_4$ depicted in FIG. 6A. At normal incidence the range of $\lambda_3$ to $\lambda_4$ overlaps the range of $\lambda_1$ to $\lambda_2$ and at an oblique incidence angle, the range of $\lambda_3$ to $\lambda_4$ does not overlap the range of $\lambda'_1$ to $\lambda'_2$. In other embodiments, the first reflection band overlaps the output band and/or the input band an oblique incidence angle (e.g., 45 or 60 degrees), but not at normal incidence. For example, the first reflection band may correspond to reflection band 752 and the output band and/or input band may be in a wavelength range of $\lambda_3$ to $\lambda_4$ depicted in FIG. 7A. At normal incidence the range of $\lambda_3$ to $\lambda_4$ does not overlap the range of $\lambda_1$ to $\lambda_2$ and at an oblique incidence angle, the range of $\lambda_3$ to $\lambda_4$ does overlap the range of $\lambda'_1$ to $\lambda'_2$. In some embodiments, the optical system includes both the light source and the sensor where the sensor, the light source and the optical stack are in optical communication with each other as described further elsewhere herein.

EXAMPLES

The examples that follow illustrate means of fabrication and test results for optical stacks including a coextruded oriented polymeric multilayer optical film and a non-birefringent optical filter designed to overlap at least one band edge of the polymeric multilayer optical film at normal incidence.

Test Methods Optical spectra for were measured using a Perkin Elmer Lambda 900 UV/VIS spectrophotometer.

Preparatory Example 1

Figure 11:
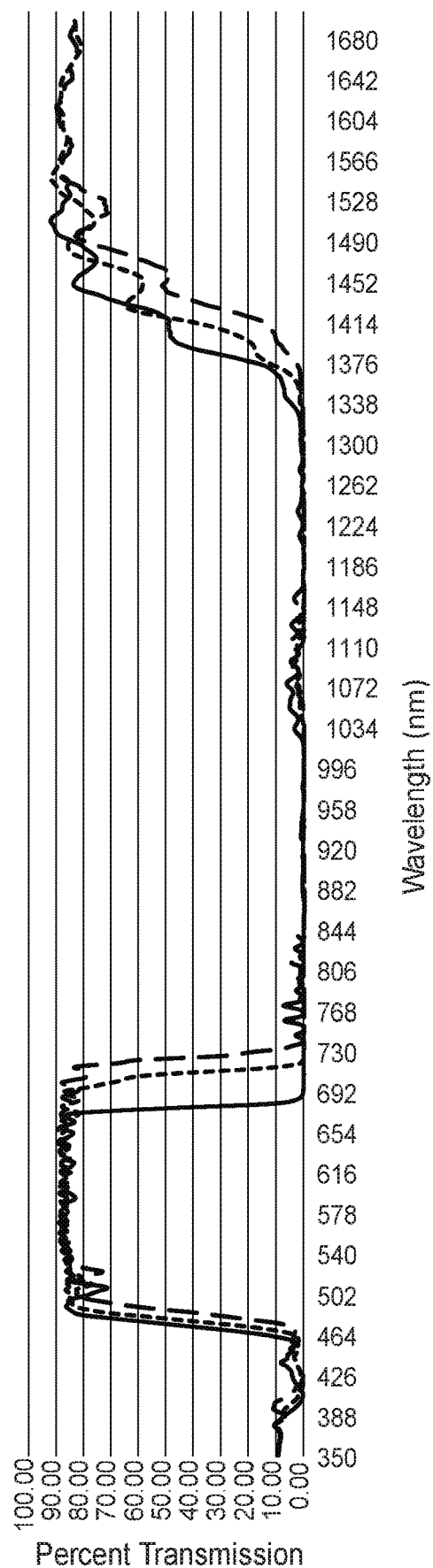
FIGS. 11-18 are plots of percent transmission versus wavelength for optical filters.

An oriented polymeric multilayer optical film was prepared as generally described in U.S. Pat. No. 5,882,774 (Jonza et al.). The film included a single multilayer optical packet comprised of 550 alternating layers of high index layers of polyethylene naphthalate (PEN) and low index layers of polymethylmethacrylate (PMMA), and included a protective skin layer of PEN on each side, for a total of 552 layers. The film was extruded and biaxially stretched to produce an oriented polymeric multilayer optical film having the optical spectra shown in FIG. 11 at normal incidence. The optical spectra shown in FIG. 11 includes data taken from multiple sections of the film overlaid to demonstrate the result of process variations. In this example, the optical band edge was at ~700 nm and cross-web variation was on the order of 50 nm.

Preparatory Example 2

Figure 12:
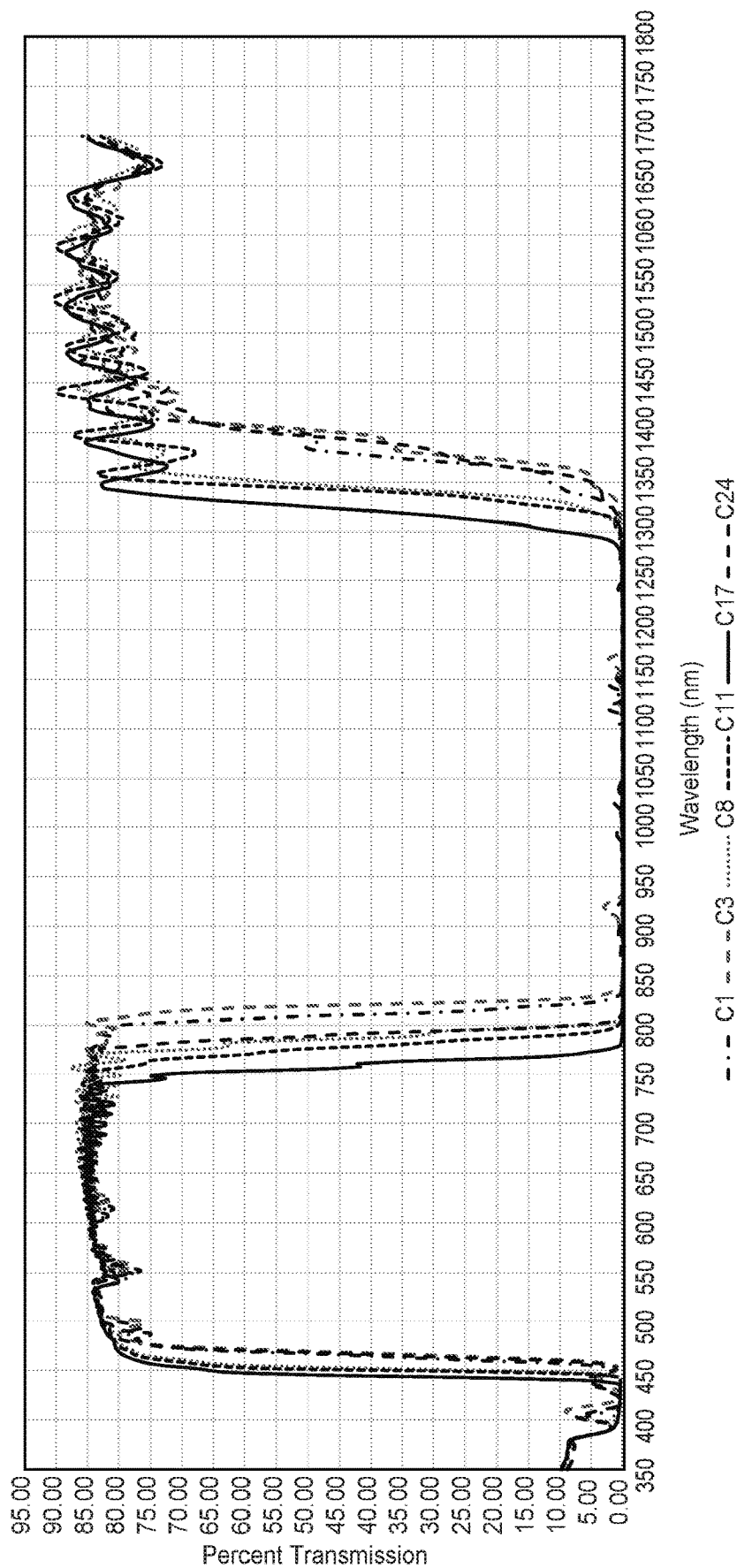

An oriented polymeric multilayer optical film was prepared as described generally for Preparatory Example 1. The film was extruded and biaxially stretched to produce an oriented polymeric multilayer optical film having the optical spectra shown in FIG. 12. The optical spectra shown in FIG. 12 includes film data taken at multiple locations which are overlaid to demonstrate the result of process variations. The curves labeled C1, C3, C8, C11, C17 and C24 correspond to crossweb positions across the film a 2.8 inches, 4.7, inches, 13.8 inches, 19.3 inches, 30.3 inches and 43.2 inches from an end of the film. In this example, the optical band edge was at ~800 nm and cross-web variation was on the order of 50 nm.

Example 1

A non-birefringent band edge correction filter in the form of a hybrid organic/inorganic interference filter was deposited using the vacuum deposition procedures generally described in U.S. Pat. No. 7,018,713 (Padiyath et al.). For the purposes of this Example, the hybrid filter was deposited onto a PET film substrate and subsequently laminated onto the multilayer optical film stack described as Preparatory Example 1 to produce an optical stack. Alternatively, the hybrid filter could have been directly coated onto the multilayer optical film stack of Preparatory Example 1.

Figure 13:
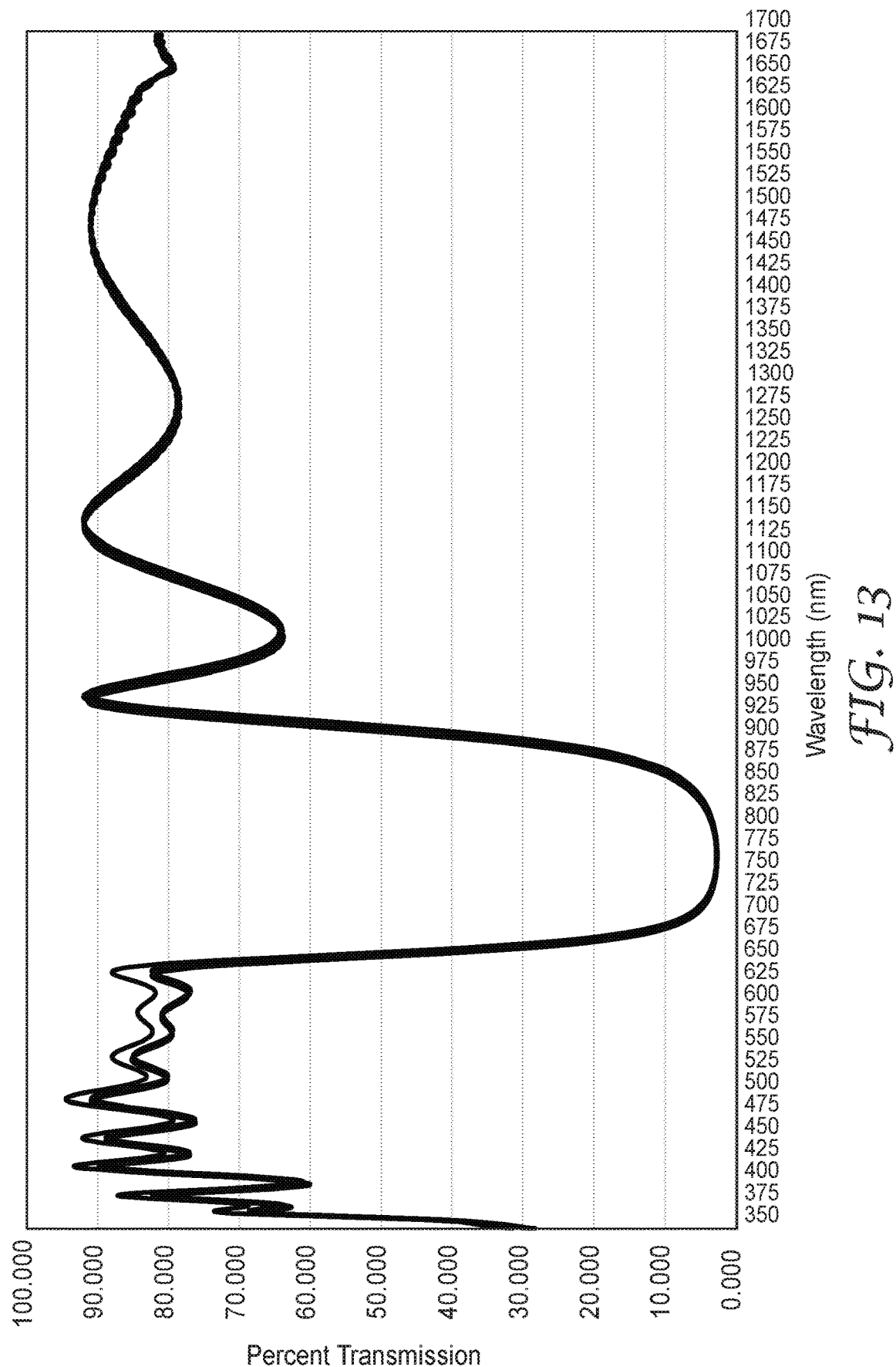

The hybrid filter, which was a non-birefringent optical filter, was designed as a 12 layer stack with high index (n=1.983 at 681 nm) inorganic layers (ZnO:Al) at 98.3 nm thickness alternating with low index (n=1.488 at 681 nm) organic polymer layers at 114.4 nm thickness. The optical spectra of this hybrid non-birefringent correction filter are shown in FIG. 13.

Figure 14:
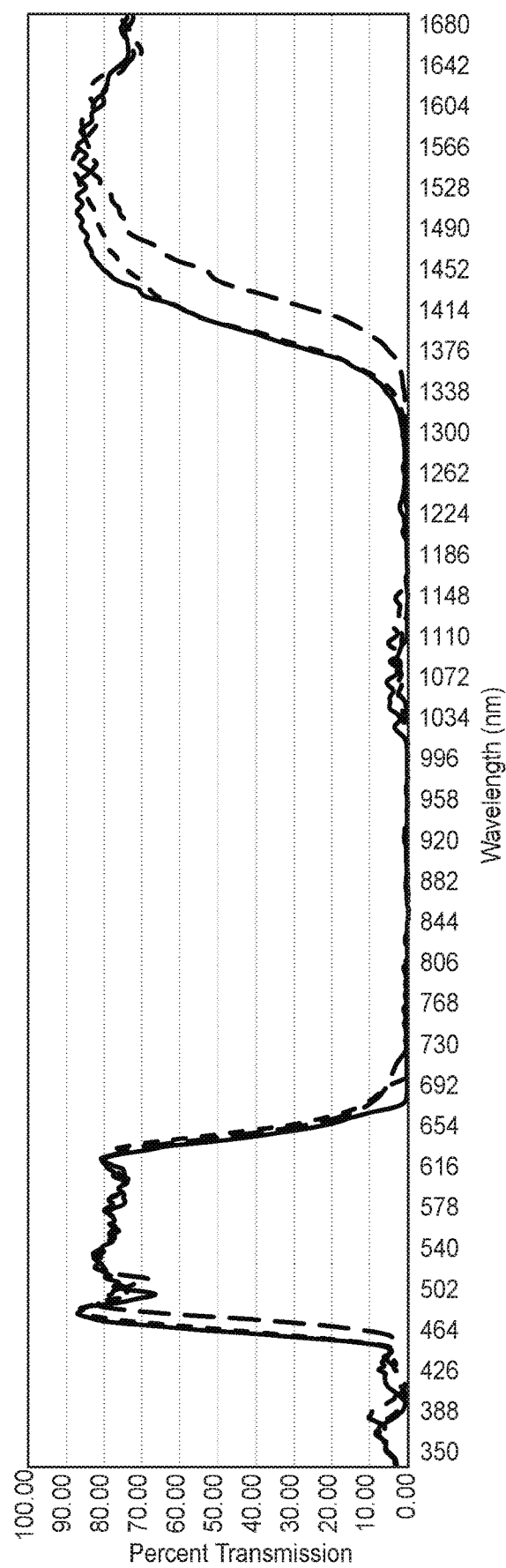

After lamination of hybrid filter of this Example onto the oriented polymeric multilayer optical film of Preparatory Example 1, the resulting optical spectra was measured with results displayed in FIG. 14. The resulting band edge wavelength shifted to that of the hybrid filter at 660 nm with cross-web variation reduced from ~50 nm to less than 5 nm.

Example 2

Figure 15:
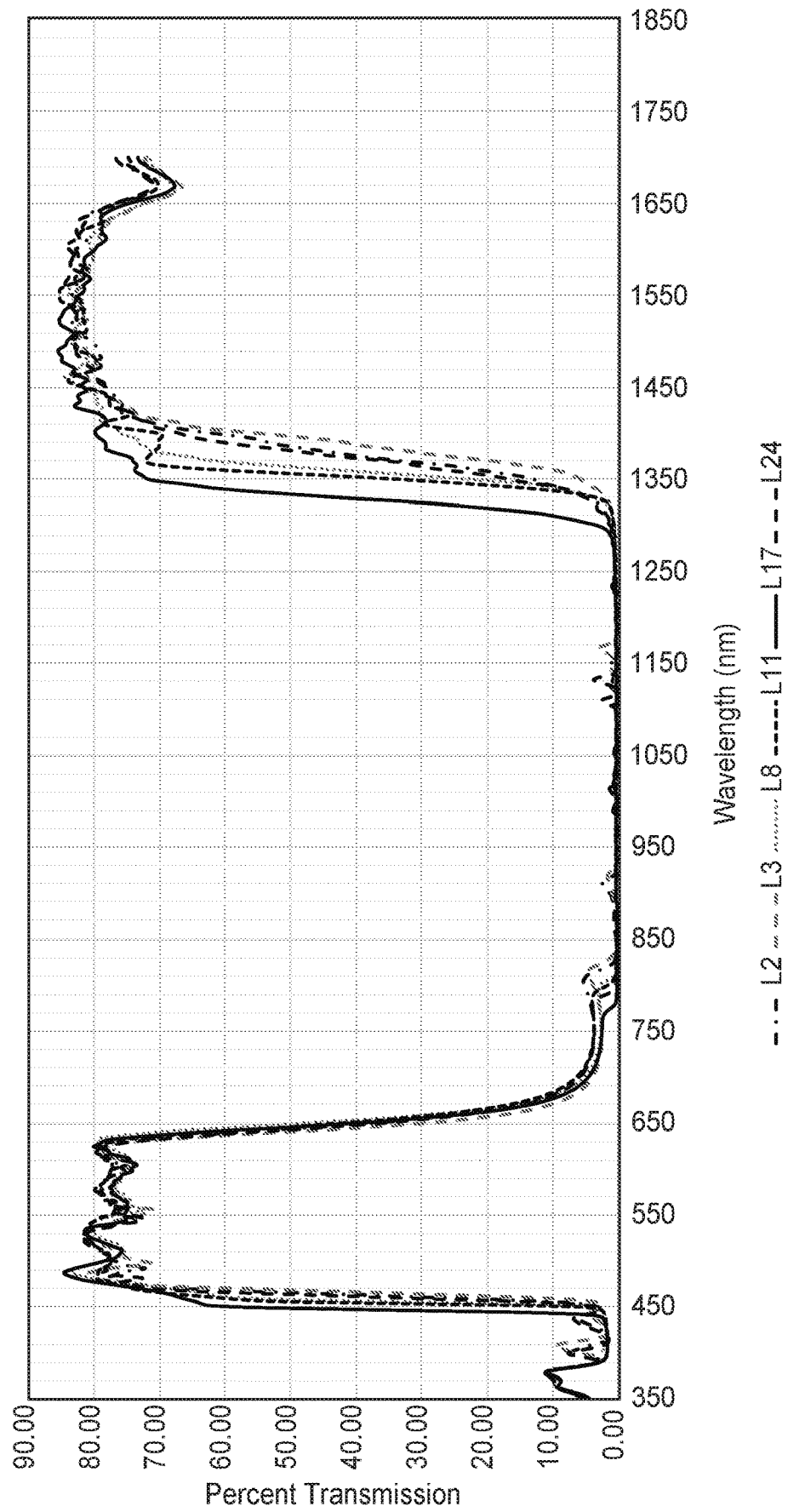

The same hybrid filter formed on PET that was used for Example 1 was laminated onto the oriented polymeric multilayer optical film of Preparatory Example 2 to produce an optical stack. The resulting optical spectra was measured with results displayed in FIG. 15. The curves labeled L1, L3, L8, L11, L17 and L24 correspond to C1, C3, C8, C11, C17 and C24, respectively, of FIG. 12. The resulting measurements showed the band edge wavelength to shift to that of the hybrid filter at ~660 nm with cross-web variation reduced from ~50 nm to less than 5 nm.

Example 3

Figure 16:
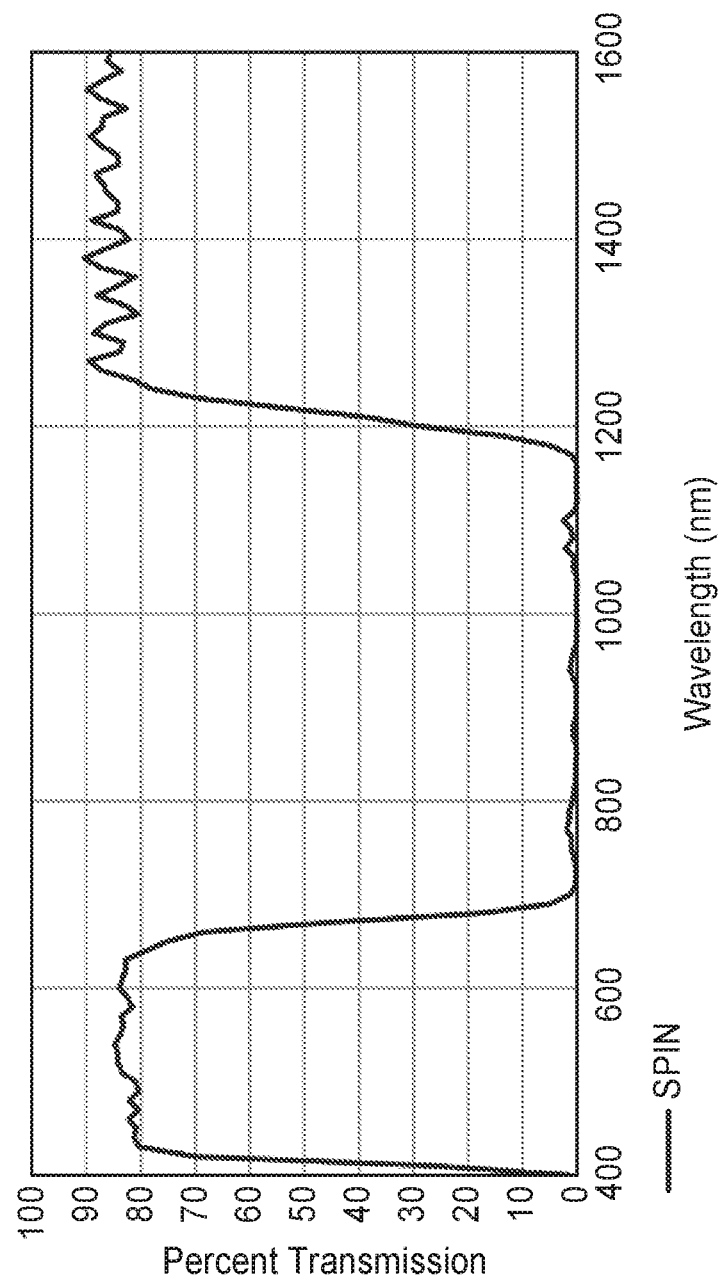
Figure 17:
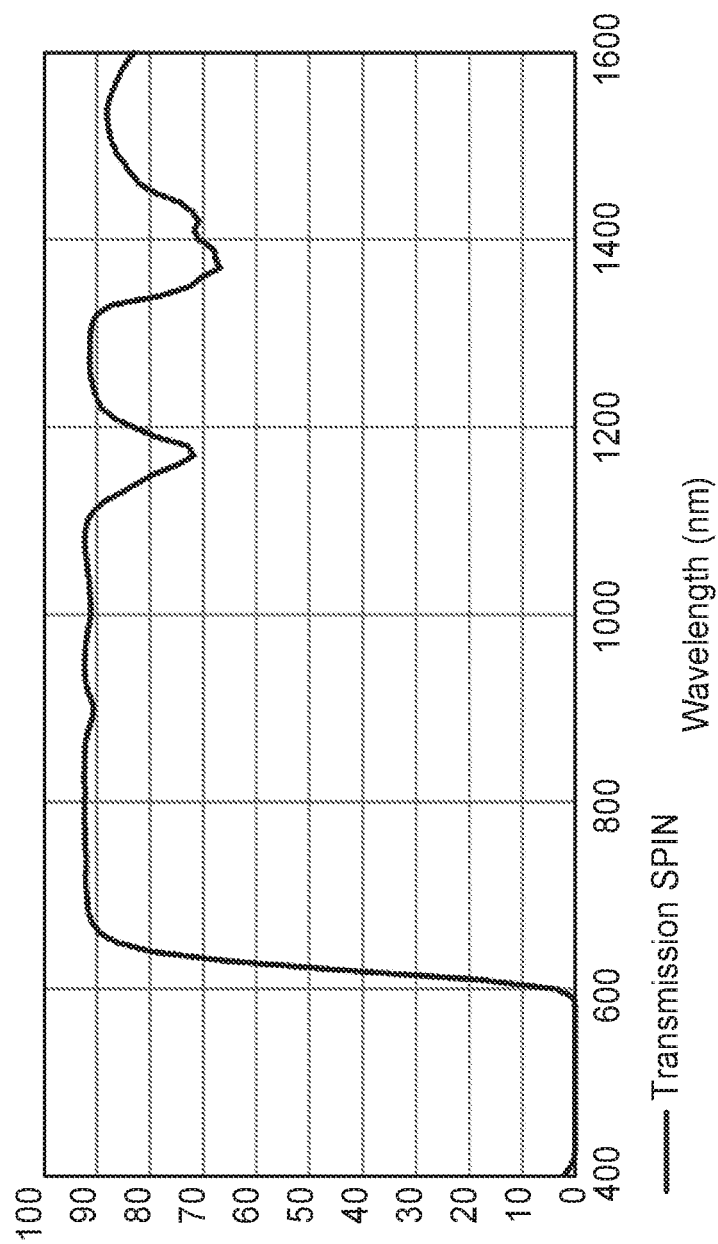

This Example demonstrates the use of an absorptive dye layer to provide correction to band edge of a multilayer optical film. An oriented polymeric multilayer optical film was produce as in Preparatory Example 1 and had the spectra shown in FIG. 16 (and also shown as curve 1882 in FIG. 18). For this Example, a sample of ⅛" thick Acrylite 257-0 GP Red (Cyro Corporation) was used as a non-birefringent optical filter. This material contained a spectrally sharp absorbing dye in an acrylic host as shown in the transmission spectrum of FIG. 17 (also shown as curve 1884 in FIG. 18). It absorbs heavily below about 610 nm, and has a sharp transition to high transmission at higher wavelengths.

Figure 18:
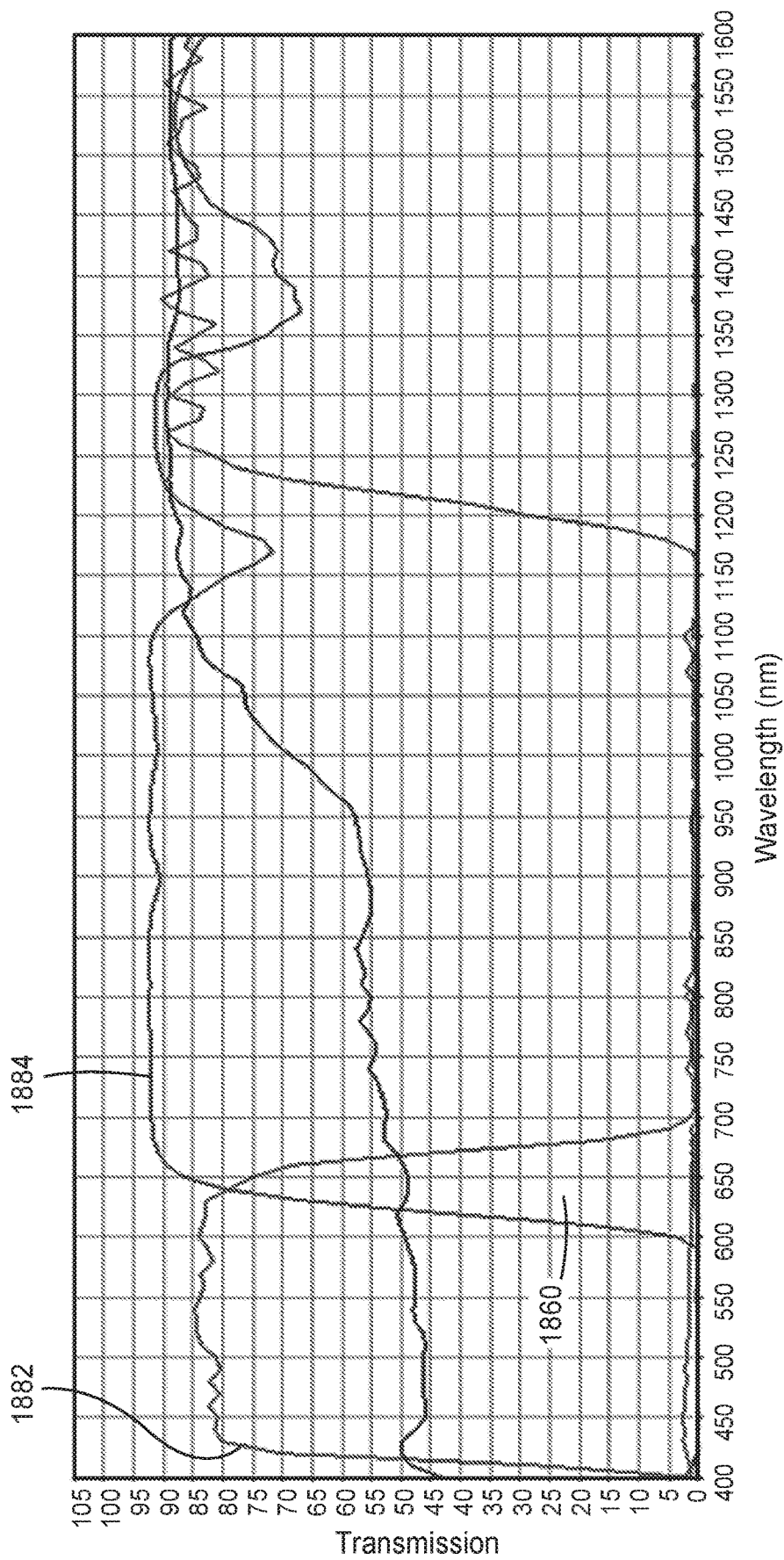

The Acrylite 257-0 GP Red layer was placed adjacent the oriented polymeric multilayer optical film to produce an optical stack which was a notch filter at normal incidence with a passband 1860 having peak transmission at about 640 nm with a full-width half-maximum of about 55 nm as shown in FIG. 18. Since the absorber band edge does not shift with incidence angle and the oriented polymeric multilayer optical film interference filter shifts to lower wavelengths with increasing incidence angle, the transmission notch closes quickly as a function of angle. Transmission through the optical stack was observed to shift from red to black as the angle of incidence changed from normal to about 30 degrees.

The following is a list of exemplary embodiments of the present description,

Embodiment 1 is an optical stack comprising:
an oriented polymeric multilayer optical film having a first reflection band with a first band edge having a variation across a length or a width of the multilayer optical film, the first band edge, at normal incidence, having a design wavelength $\lambda$ and a characteristic deviation about the design wavelength $\Delta$;
a first non-birefringent optical filter disposed adjacent the multilayer optical film and having a first blocking band, the first blocking band, at normal incidence, comprising wavelengths between $\lambda-\Delta/2$ and $\lambda+\Delta/2$,
wherein, at normal incidence, the first reflection band includes a wavelength range having a width of at least $\Delta$ that is outside of the first blocking band.

Embodiment 2 is the optical stack of Embodiment 1, wherein the first non-birefringent optical filter is a non-birefringent reflector and the first blocking band is a reflection band.

Embodiment 3 is the optical stack of Embodiment 2, wherein the non-birefringent reflector comprises a plurality of alternating first and second layers.

Embodiment 4 is the optical stack of Embodiment 3, wherein the first and second layers are inorganic.

Embodiment 5 is the optical stack of Embodiment 4, wherein the first layer is inorganic and the second is organic.

Embodiment 6 is the optical stack of Embodiment 1, wherein the blocking band is an absorbing band.

Embodiment 7 is the optical stack of Embodiment 1, wherein the blocking band is a second reflection band.

Embodiment 8 is the optical stack of Embodiment 1, further comprising a second non-birefringent optical filter, the first reflection band having a second band edge having a second design wavelength at normal incidence, the second non-birefringent optical filter having a second blocking band comprising the second design wavelength.

Embodiment 9 is the optical stack of Embodiment 1, wherein the first non-birefringent optical filter is disposed directly on the multilayer optical film.

Embodiment 10 is the optical stack of Embodiment 1, wherein an intermediate layer separates the non-birefringent optical filter and the multilayer optical film.

Embodiment 11 is the optical stack of Embodiment 10, wherein the intermediate layer is an adhesive layer.

Embodiment 12 is the optical stack of Embodiment 10, wherein the intermediate layer comprises one or more dyes or pigments.

Embodiment 13 is the optical stack of Embodiment 12, wherein the one or more dyes or pigments comprises one or more polarizing dyes or pigments.

Embodiment 14 is the optical stack of Embodiment 1, wherein an air gap separates the non-birefringent optical filter and the multilayer optical film.

Embodiment 15 is the optical stack of Embodiment 1 being substantially flat.

Embodiment 16 is the optical stack of Embodiment 1 being curved about at least one axis.

Embodiment 17 is the optical stack of Embodiment 16 being curved about two orthogonal axes.

Embodiment 18 is the optical stack of Embodiment 1, wherein the first non-birefringent optical filter has a second blocking band.

Embodiment 19 is the optical stack of Embodiment 18, wherein one of the first and second blocking bands is a first order reflection band and the other of the first and second blocking bands is a second order reflection band.

Embodiment 20 is the optical stack of Embodiment 1, wherein the oriented polymeric multilayer optical film is a reflective polarizer.

Embodiment 21 is the optical stack of Embodiment 1, wherein the oriented polymeric multilayer optical film is a mirror film.

Embodiment 22 is the optical stack of Embodiment 1, wherein the oriented polymeric multilayer optical film is a comb filter.

Embodiment 23 is the optical stack of Embodiment 1, further comprising a marker in optical communication with the oriented polymeric multilayer optical film and with the first non-birefringent optical filter.

Embodiment 24 is the optical stack of Embodiment 23, wherein the marker comprises a specular reflector, a diffuse reflector, or a semi-specular reflector.

Embodiment 25 is the optical stack of Embodiment 23, wherein the marker comprises a retroreflector.

Embodiment 26 is an optical stack comprising:
an oriented polymeric multilayer optical film having a first reflection band with a first band edge at normal incidence at an undesired band edge wavelength;
a first non-birefringent optical filter adjacent the multilayer optical film and having a first blocking band, the first blocking band, at normal incidence, comprising the undesired band edge wavelength and having a second band edge at a first desired band edge wavelength.

Embodiment 27 is the optical stack of Embodiment 26, further comprising a second non-birefringent optical filter having a second blocking band, the first reflection band having a third band edge at normal incidence at a second undesired band edge wavelength, the second blocking band comprising the second undesired wavelength and having a fourth band edge at a second desired band edge wavelength.

Embodiment 28 is the optical stack of Embodiment 27, wherein one of the first and second non-birefringent optical filters is absorbing and one is reflective.

Embodiment 29 is the optical stack of Embodiment 26, wherein at least one of the non-birefringent optical filter and the oriented polymeric multilayer optical film is spatially variant.

Embodiment 30 is the optical stack of Embodiment 29, wherein the oriented polymeric multilayer optical film includes one or more holes therethrough.

Embodiment 31 is the optical stack of Embodiment 29, wherein the non-birefringent optical filter is discontinuous across a length or a width of the non-birefringent optical filter.

Embodiment 32 is the optical stack of Embodiment 26, wherein the first non-birefringent optical filter is disposed directly on the multilayer optical film.

Embodiment 33 is the optical stack of Embodiment 26, wherein an intermediate layer separates the non-birefringent optical filter and the multilayer optical film.

Embodiment 34 is the optical stack of Embodiment 26, wherein an air gap separates the non-birefringent optical filter and the multilayer optical film.

Embodiment 35 is the optical stack of Embodiment 26 being substantially flat.

Embodiment 36 is the optical stack of Embodiment 26 being curved about at least one axis.

Embodiment 37 is the optical stack of Embodiment 36 being curved about two orthogonal axes.

Embodiment 38 is the optical stack of Embodiment 26, wherein the blocking band is an absorbing band.

Embodiment 39 is the optical stack of Embodiment 26, wherein the blocking band is a second reflection band.

Embodiment 40 is the optical stack of Embodiment 26, wherein the oriented polymeric multilayer optical film is a reflective polarizer.

Embodiment 41 is the optical stack of Embodiment 26, wherein the oriented polymeric multilayer optical film is a mirror film.

Embodiment 42 is the optical stack of Embodiment 26, wherein the oriented polymeric multilayer optical film is a comb filter.

Embodiment 43 is the optical stack of Embodiment 26, further comprising a marker in optical communication with the oriented polymeric multilayer optical film and with the first non-birefringent optical filter.

Embodiment 44 is the optical stack of Embodiment 43, wherein the marker comprises a specular reflector, a diffuse reflector, or a semi-specular reflector.

Embodiment 45 is the optical stack of Embodiment 43, wherein the marker comprises a retroreflector.

Embodiment 46 is an optical stack comprising:
an oriented polymeric multilayer optical film having a first reflection band having a first band width at normal incidence and having a first band edge that has a first shift between normal incidence and an incidence angle of 60 degrees;
a first non-birefringent optical filter disposed adjacent the oriented polymeric multilayer optical film and having a first blocking band having a second band width at normal incidence and having a second band edge that has a second shift between normal incidence and an incidence angle of 60 degrees,
wherein the first shift is different from the second shift.

Embodiment 47 is the optical stack of Embodiment 46, wherein the first band width is greater than the second band width.

Embodiment 48 is the optical stack of Embodiment 46, wherein the first band width is at least 1.3 times the second band width.

Embodiment 49 is the optical stack of Embodiment 46, wherein the first band width is at least 1.5 times the second band width.

Embodiment 50 is the optical stack of Embodiment 46, wherein the first shift is less than the second shift.

Embodiment 51 is the optical stack of Embodiment 46, wherein the first shift is greater than the second shift.

Embodiment 52 is the optical stack of Embodiment 46, wherein the first shift is at least 1.3 times the second shift.

Embodiment 53 is the optical stack of Embodiment 46, wherein the first shift is at least 1.5 times the second shift.

Embodiment 54 is the optical stack of Embodiment 46, wherein the first band edge is at a first wavelength at normal incidence and the first blocking band includes the first wavelength at normal incidence.

Embodiment 55 is the optical stack of Embodiment 46, wherein the first non-birefringent optical filter is a non-birefringent reflector and the optical stack has an overall reflection band arising from the first reflection band and the first blocking band, the overall reflection band having a third band width at normal incidence and having a third band edge that has a third shift between normal incidence and an incidence angle of 60 degrees, the third band width greater than the first band width, the third shift equal to the second shift.

Embodiment 56 is the optical stack of Embodiment 46, wherein the first blocking band is entirely contained in the first reflection band at normal incidence and is not is entirely contained in the first reflection band at an oblique incidence angle.

Embodiment 57 is the optical stack of Embodiment 56, wherein the oblique incidence angle is 60 degrees.

Embodiment 58 is the optical stack of Embodiment 56, wherein the blocking band extends to the left of the first reflection band at the oblique incidence angle.

Embodiment 59 is the optical stack of Embodiment 56, wherein the blocking band extends to the right of the first reflection band at the oblique incidence angle.

Embodiment 60 is the optical stack of Embodiment 46, wherein the first reflection band and the first blocking band do not overlap at normal incidence and do overlap at an oblique incidence angle.

Embodiment 61 is the optical stack of Embodiment 60, wherein the oblique incidence angle is 60 degrees.

Embodiment 62 is the optical stack of Embodiment 60, wherein, at the oblique incidence angle, the first blocking band overlaps a left band edge of the first reflection band.

Embodiment 63 is the optical stack of Embodiment 60, wherein, at the oblique incidence angle, the first blocking band overlaps a right band edge of the first reflection band.

Embodiment 64 is the optical stack of Embodiment 46, wherein the first reflection band and the first blocking band overlap at normal incidence and do not overlap at an oblique incidence angle.

Embodiment 65 is the optical stack of Embodiment 64, wherein the oblique incidence angle is 60 degrees.

Embodiment 66 is the optical stack of Embodiment 46, wherein the oriented polymeric multilayer optical film is a reflective polarizer.

Embodiment 67 is the optical stack of Embodiment 46, wherein the oriented polymeric multilayer optical film is a mirror film.

Embodiment 68 is the optical stack of Embodiment 46, wherein the oriented polymeric multilayer optical film is a comb filter.

Embodiment 69 is the optical stack of Embodiment 46, further comprising a marker in optical communication with the oriented polymeric multilayer optical film and with the first non-birefringent optical filter.

Embodiment 70 is the optical stack of Embodiment 69, wherein the marker comprises a specular reflector, a diffuse reflector, or a semi-specular reflector.

Embodiment 71 is the optical stack of Embodiment 69, wherein the marker comprises a retroreflector.

Embodiment 72 is an optical system comprising the optical stack of any one of the previous Embodiments directed to an optical stack and further comprising one or both of a light source and a sensor in optical communication with the optical stack.

Embodiment 73 is the optical system of Embodiment 72 comprising the light source.

Embodiment 74 is the optical system of Embodiment 73, wherein the light source is configured to produce light in an output band having a full-width at half-maximum of no more than 40 nm.

Embodiment 75 is the optical system of Embodiment 74, wherein the first reflection band overlaps the output band at normal incidence, but not at an oblique incidence angle.

Embodiment 76 is the optical system of Embodiment 74, wherein the first reflection band overlaps the output band an oblique incidence angle, but not at normal incidence.

Embodiment 77 is the optical system of Embodiment 73 further comprising the sensor, wherein the sensor, the light source and the optical stack are in optical communication with each other.

Embodiment 78 is an optical system comprising:
an oriented polymeric multilayer optical film having a first reflection band with a first band edge and
a light source configured to produce light in an output band, the light source in optical communication with the oriented polymeric multilayer optical film,
wherein the first reflection band overlaps the output band at normal incidence, but not at an oblique incidence angle.

Embodiment 79 is an optical system comprising:
an oriented polymeric multilayer optical film having a first reflection band with a first band edge and
a light source configured to produce light in an output band, the light source in optical communication with the oriented polymeric multilayer optical film,
wherein the first reflection band overlaps the output band at an oblique incidence angle, but not at normal incidence.

Embodiment 80 is the optical system of Embodiment 78 or 79, wherein the oblique incidence angle is 60 degrees.

Embodiment 81 is the optical system of Embodiment 78 or 79, wherein the output band has a full-width at half-maximum of no more than 40 nm.

Embodiment 82 is the optical system of Embodiment 78 or 79, further comprising a sensor in optical communication with the oriented polymeric multilayer optical film and with the light source.

Embodiment 83 is an optical system comprising:
an oriented polymeric multilayer optical film having a first reflection band with a first band edge and
a sensor configured to receive light in an input band, the sensor in optical communication with the oriented polymeric multilayer optical film,
wherein the first reflection band overlaps the input band at normal incidence, but not at an oblique incidence angle.

Embodiment 84 is an optical system comprising:
an oriented polymeric multilayer optical film having a first reflection band with a first band edge and
a sensor configured to receive light in an input band, the sensor in optical communication with the oriented polymeric multilayer optical film,
wherein the first reflection band overlaps the input band at an oblique incidence angle, but not at normal incidence.

Embodiment 85 is the optical system of Embodiment 83 or 84, wherein the oblique incidence angle is 60 degrees.

Embodiment 86 is the optical system of Embodiment 83 or 84, wherein the output band has a full-width at half-maximum of no more than 40 nm.

Embodiment 87 is the optical system of Embodiment 83 or 84, further comprising a light source in optical communication with the oriented polymeric multilayer optical film and with the sensor.

Embodiment 88 is the optical system of Embodiment 87, wherein the light source is configured to produce light in an output band having a full-width at half-maximum of no more than 40 nm.

Embodiment 89 is the optical system of Embodiment 83 or 84, wherein the sensor comprises an optical filter limiting the light transmitted into the sensor to the input band.

Embodiment 90 is a method of modifying a first reflection band of an oriented polymeric multilayer optical film, the method comprising:

providing the oriented polymeric multilayer optical film having the first reflection band, the first reflection band having a band edge at a first wavelength at normal incidence;

determining a desired normal incidence band edge wavelength;

selecting a non-birefringent optical filter having a first blocking band, the first blocking band having the desired normal incidence band edge wavelength and including the first wavelength at normal incidence; and positioning the non-birefringent reflector in optical communication with the oriented polymeric multilayer optical film.

Embodiment 91 is the method of Embodiment 90, wherein the non-birefringent optical filter is a non-birefringent reflector and the first blocking band is a second reflection band, and wherein selecting the non-birefringent optical filter comprises selecting different first and second materials such that a stack of alternating layers of the first and second materials provides the second reflection band.

Embodiment 92 is the method of Embodiment 91, wherein the positioning step comprises depositing the stack of alternating layers directly onto the oriented polymeric multilayer optical film.

Embodiment 93 is the method of Embodiment 92, wherein the depositing step comprises depositing the stack through a mask resulting in a spatially variant non-birefringent reflector.

Embodiment 94 is the method of Embodiment 91, wherein positioning step comprises depositing the stack of alternating layers onto a substrate to form the non-birefringent reflector and positioning the formed non-birefringent reflector adjacent to the oriented polymeric multilayer optical film.

Embodiment 95 is the method of any one of Embodiments 92 to 94, wherein the depositing step comprises one or more of atomic layer deposition, sputtering, chemical vapor deposition, and layer-by-layer self-assembly.

Embodiment 96 is the method of Embodiment 94, further comprising laminating the formed non-birefringent reflector onto the oriented polymeric multilayer optical film.

Embodiment 97 is the method of Embodiment 94, wherein the formed non-birefringent reflector is positioned adjacent to the oriented polymeric multilayer optical film with a gap therebetween.

Embodiment 98 is the method of Embodiment 90, further comprising cutting out portions of the oriented polymeric multilayer optical film to form a spatially variant multilayer optical film.

Embodiment 99 is the method of Embodiment 90, wherein the positioning step comprises in-mold forming of the non-birefringent optical filter adjacent the oriented polymeric multilayer optical film.

Embodiment 100 is the method of Embodiment 99, wherein the in-mold forming results in a flat oriented polymeric multilayer optical film.

Embodiment 101 is the method of Embodiment 99, wherein the in-mold forming results in an oriented polymeric multilayer optical film curved about at least one axis.

Embodiment 102 is the method of Embodiment 101, wherein the in-mold formed oriented polymeric multilayer optical film is curved about two orthogonal axes.

Embodiment 103 is the method of Embodiment 90, wherein the positioning step comprises one or more of printing, spraying, and laminating an absorbing material onto a substrate and disposing the substrate adjacent the oriented polymeric multilayer optical film.

Embodiment 104 is the method of Embodiment 90, wherein the positioning step comprises one or more of printing, spraying, and laminating an absorbing material onto the oriented polymeric multilayer optical film.

Embodiment 105 is the optical system of any one of the previous Embodiments to an optical system comprising a light source, further comprising a marker in optical communication with the light source.

Embodiment 106 is the optical system of any one of the previous Embodiments to an optical system comprising a sensor, further comprising a marker in optical communication with the sensor.

Embodiment 107 is the optical system of Embodiment 105 or Embodiment 106, wherein the maker comprises an optical stack according to any one of the previous Embodiments directed to an optical stack.

Embodiment 108 is the optical system of Embodiment 105 or Embodiment 106, wherein the maker comprises a specular reflector, a diffuse reflector, or a semi-specular reflector.

Embodiment 109 is the optical system of Embodiment 105 or Embodiment 106, wherein the marker comprises a retroreflector.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack comprising:
an oriented polymeric multilayer optical film having a first reflection band with a first band edge having a variation across a length or a width of the multilayer optical film, the first band edge, at normal incidence, having a design wavelength $\lambda$ and a characteristic deviation about the design wavelength $\Delta$; and
a first non-birefringent optical filter disposed adjacent the multilayer optical film and having a first blocking band, the first blocking band, at normal incidence, comprising wavelengths between $\lambda-\Delta/2$ and $\lambda+\Delta/2$,
wherein, at normal incidence, the first reflection band includes a wavelength range having a width of at least $\Delta$ that is outside of the first blocking band.

2. The optical stack of claim 1, wherein the first non-birefringent optical filter is a non-birefringent reflector and the first blocking band is a reflection band.

3. The optical stack of claim 1, wherein the first blocking band is an absorbing band.

4. The optical stack of claim 1, wherein the first blocking band is a second reflection band.

5. The optical stack of claim 1, further comprising a second non-birefringent optical filter, the first reflection band having a second band edge having a second design wavelength at normal incidence, the second non-birefringent optical filter having a second blocking band comprising the second design wavelength.

6. An optical system comprising the optical stack of claim 1 and further comprising one or both of a light source and a sensor in optical communication with the optical stack.

7. The optical system of claim 6 comprising the light source wherein the light source is configured to produce light in an output band having a full-width at half-maximum of no more than 40 nm.

8. The optical system of claim 7, wherein the first reflection band overlaps the output band at normal incidence, but not at an oblique incidence angle.

9. The optical system of claim 7, wherein the first reflection band overlaps the output band an oblique incidence angle, but not at normal incidence.

10. An optical stack comprising:
an oriented polymeric multilayer optical film having a first reflection band with a first band edge at normal incidence at an undesired band edge wavelength; and
a first non-birefringent optical filter adjacent the multilayer optical film and having a first blocking band, the first blocking band, at normal incidence, comprising the undesired band edge wavelength and having a second band edge at a first desired band edge wavelength.

11. The optical stack of claim 10, further comprising a second non-birefringent optical filter having a second blocking band, the first reflection band having a third band edge at normal incidence at a second undesired band edge wavelength, the second blocking band comprising the second undesired band edge wavelength and having a fourth band edge at a second desired band edge wavelength.

12. The optical stack of claim 10, further comprising a marker in optical communication with the oriented polymeric multilayer optical film and with the first non-birefringent optical filter.

13. An optical stack comprising:
an oriented polymeric multilayer optical film having a first reflection band having a first band width at normal incidence and having a first band edge that has a first shift between normal incidence and an incidence angle of 60 degrees; and
a first non-birefringent optical filter disposed adjacent the oriented polymeric multilayer optical film and having a first blocking band having a second band width at normal incidence and having a second band edge that has a second shift between normal incidence and an incidence angle of 60 degrees,
wherein the first shift is different from the second shift.

14. The optical stack of claim 13, wherein the first band width is greater than the second band width.

15. The optical stack of claim 13, wherein the first shift is less than the second shift.

16. The optical stack of claim 13, wherein the first shift is greater than the second shift.

17. The optical stack of claim 13, wherein the first band edge is at a first wavelength at normal incidence and the first blocking band includes the first wavelength at normal incidence.

18. The optical stack of claim 13, wherein the first non-birefringent optical filter is a non-birefringent reflector and the optical stack has an overall reflection band arising from the first reflection band and the first blocking band, the overall reflection band having a third band width at normal incidence and having a third band edge that has a third shift between normal incidence and an incidence angle of 60 degrees, the third band width greater than the first band width, the third shift equal to the second shift.

19. The optical stack of claim 13, wherein the first blocking band is entirely contained in the first reflection band at normal incidence and is not is entirely contained in the first reflection band at an oblique incidence angle.

20. The optical stack of claim 13, wherein the first reflection band and the first blocking band do not overlap at normal incidence and do overlap at an oblique incidence angle.

* * * * *

UNITED STATES PATENT AND TRADEMARK OFFICE
CERTIFICATE OF CORRECTION

PATENT NO. : 11,009,637 B2
APPLICATION NO. : 16/309187
DATED : May 18, 2021
INVENTOR(S) : Wheatley et al.

It is certified that error appears in the above-identified patent and that said Letters Patent is hereby corrected as shown below:

In the Specification

Column 7
Line 24, Delete "4" and insert -- $\Delta$ --, therefor.
Line 24, Delete "41 or 42" and insert -- $\Delta_1$ or $\Delta_2$ --, therefor.
Line 32, Delete "4" and insert -- $\Delta$ --, therefor.

Column 8
Line 41, Delete "$\lambda"3$ and $\lambda"4$," and insert -- $\lambda"_3$ and $\lambda"_4$, --, therefor.

Column 15
Line 2, Delete "-700 nm" and insert -- ~700 nm --, therefor.
Line 18, Delete "-800 nm" and insert -- ~800 nm --, therefor.
Line 44, Delete "660 nm" and insert -- ~660 nm --, therefor.
Line 57, Delete "-660 nm" and insert -- ~660 nm --, therefor.

In the Claims

Column 24 (Claim 19)
Line 36, Delete "is not is" and insert -- is not --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*